(12) United States Patent
Yoshimi et al.

(10) Patent No.: US 11,626,111 B2
(45) Date of Patent: Apr. 11, 2023

(54) INFORMATION PROCESSING SYSTEM, INFORMATION PROCESSING METHOD, AND INFORMATION PROCESSING APPARATUS

(71) Applicant: Ricoh Company, Ltd., Tokyo (JP)

(72) Inventors: Shun Yoshimi, Kanagawa (JP); Keisuke Terasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 90 days.

(21) Appl. No.: 17/023,468

(22) Filed: Sep. 17, 2020

(65) Prior Publication Data

US 2021/0151051 A1    May 20, 2021

(30) Foreign Application Priority Data

Nov. 15, 2019   (JP) .............................. JP2019-207364

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
USPC ................................... 704/251, 231, 1–504
See application file for complete search history.

(56) References Cited

U.S. PATENT DOCUMENTS

| 9,479,729 B2 * | 10/2016 | Yoshida .................. H04N 7/147 |
| 2014/0172430 A1 * | 6/2014 | Rutherford ............ G06Q 20/20 704/273 |
| 2019/0102116 A1 * | 4/2019 | Fukumoto ............. G06F 3/1236 |
| 2019/0182566 A1 * | 6/2019 | Watanabe ........... H04L 12/2805 |
| 2019/0304453 A1 | 10/2019 | Nakamura |
| 2019/0371327 A1 * | 12/2019 | Quinn ..................... G10L 15/16 |
| 2020/0175982 A1 | 6/2020 | Nakamura |
| 2020/0175984 A1 | 6/2020 | Iwasa |
| 2020/0177407 A1 | 6/2020 | Nakamura |
| 2020/0177744 A1 | 6/2020 | Yoshimi |
| 2020/0177746 A1 | 6/2020 | Katsumata |
| 2020/0177747 A1 | 6/2020 | Yasuda et al. |
| 2020/0379639 A1 * | 12/2020 | Kitazawa ................ G06F 3/038 |
| 2021/0151051 A1 * | 5/2021 | Yoshimi .................. G10L 15/30 |

FOREIGN PATENT DOCUMENTS

| JP | 2019-040468 | 3/2019 |
| JP | 2019-185734 | 10/2019 |
| WO | WO 2010/128339 A2 | 11/2010 |

OTHER PUBLICATIONS

U.S. Appl. No. 16/808,944, filed Mar. 4, 2020, Hajime Kubota.
Extended European Search Report dated Mar. 12, 2021 in European Patent Application No. 20197412.8, 7 pages.

* cited by examiner

*Primary Examiner* — Marcus T Riley
(74) *Attorney, Agent, or Firm* — Xsensus LLP

(57) ABSTRACT

An information processing system includes circuitry configured to acquire voice data; supplement the voice data with relating information so as to generate an output request in which at least an output device to output an output target is identified based on the voice data; transmit the output request to the identified output device; and cause the output device to output the output target contained in the output request.

10 Claims, 14 Drawing Sheets

FIG. 5A

| INFORMATION INPUT DEVICE ID | USER NAME | USER ID |
|---|---|---|
| ud1001 | Hamada | u0001 |
| ud1002 | Yamashita | u0002 |
| ... | ... | ... |

| INFORMATION INPUT DEVICE NAME | INFORMATION INPUT DEVICE ID | INFORMATION PROCESSING APPARATUS NAME | INFORMATION PROCESSING APPARATUS ID | INFORMATION PROCESSING APPARATUS CONNECTION INFORMATION | OUTPUT DEVICE NAME | OUTPUT DEVICE ID | OUTPUT DEVICE CONNECTION INFORMATION |
|---|---|---|---|---|---|---|---|
| AI SPEAKER 1 | ud1001 | PC1 | i001 | ADDRESS A | MFP_#1 | d0001 | ADDRESS 1 |
| AI SPEAKER 2 | ud1002 | PC1 | i001 | ADDRESS B | MFP_#2 | d0002 | ADDRESS 2 |
| AI SPEAKER 3 | ud1003 | PC1 | i001 | ADDRESS C | MFP_#3 | d0003 | ADDRESS 3 |
| AI SPEAKER 4 | ud1004 | PC2 | i002 | ADDRESS X | IWB_#1 | d0004 | ADDRESS 11 |
| AI SPEAKER 5 | ud1005 | PC2 | i002 | ADDRESS Y | IWB_#2 | d0005 | ADDRESS 12 |
| AI SPEAKER 6 | ud1006 | PC2 | i002 | ADDRESS Z | IWB_#3 | d0006 | ADDRESS 13 |
| ⋮ | ⋮ | ⋮ | ⋮ | ⋮ | ⋮ | ⋮ | ⋮ |
| AI SPEAKER 137 | ud1137 | PC3 | i003 | ADDRESS α | PROJECTOR_#1 | d0021 | ADDRESS 101 |
| ⋮ | ⋮ | ⋮ | ⋮ | ⋮ | ⋮ | ⋮ | ⋮ |
| AI SPEAKER 358 | ud1358 | PC4 | i004 | ADDRESS β | PROJECTOR_#5 | d0022 | ADDRESS 151 |
| ⋮ | ⋮ | ⋮ | ⋮ | ⋮ | ⋮ | ⋮ | ⋮ |
| AI SPEAKER 300 | ud1300 | PC5 | i005 | ADDRESS γ | DIGITAL SIGNAGE_#1 | d0023 | ADDRESS 201 |
| ⋮ | ⋮ | ⋮ | ⋮ | ⋮ | ⋮ | ⋮ | ⋮ |
| AI SPEAKER 400 | ud1400 | PC6 | i006 | ADDRESS δ | DIGITAL SIGNAGE_#2 | d0024 | ADDRESS 251 |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

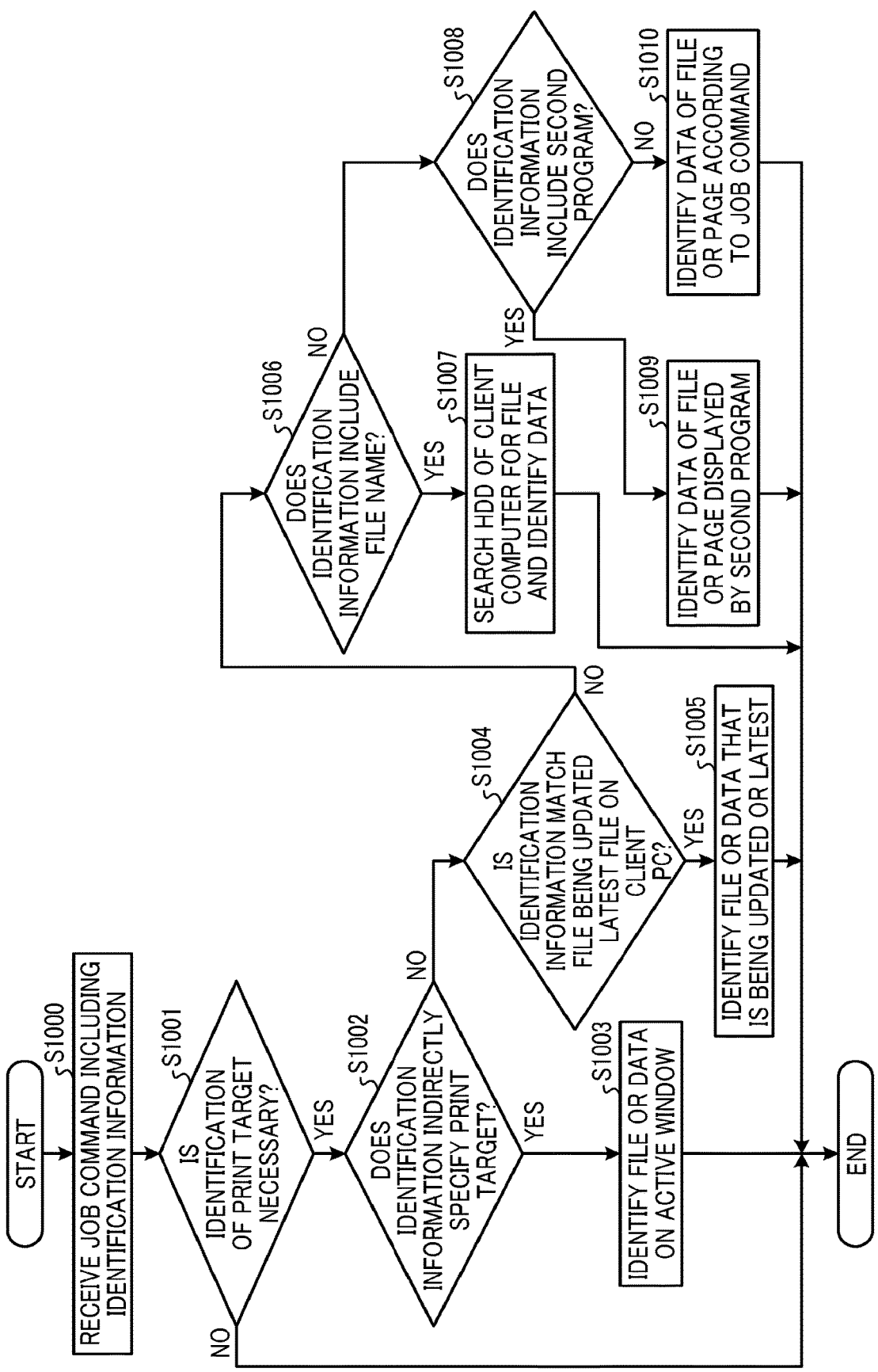

INFORMATION PROCESSING SYSTEM, INFORMATION PROCESSING METHOD, AND INFORMATION PROCESSING APPARATUS

CROSS-REFERENCE TO RELATED APPLICATION

This patent application is based on and claims priority pursuant to 35 U.S.C. § 119(a) to Japanese Patent Application No. 2019-207364, filed on Nov. 15, 2019, in the Japan Patent Office, the entire disclosure of which is hereby incorporated by reference herein.

BACKGROUND

Technical Field

The present disclosure generally relates to an information processing system, an information processing method, an information processing apparatus, and an output device.

Related Art

Currently, there are artificial intelligence (AI) voice assistants that operate responding to voice or speech commands. Further, there are smart home appliances that can be controlled with input voice (voice command), and the technology of voice control is expected to continue.

As an example of operation by voice control (voice command), a system that prints out contents in response to an input voice command is disclosed.

SUMMARY

According to an embodiment of this disclosure, an information processing system includes circuitry configured to acquire voice data; supplement the voice data with relating information so as to generate an output request in which at least an output device to output an output target is identified based on the voice data; transmit the output request to the identified output device; and cause the output device to output the output target contained in the output request.

According to another embodiment, an information processing apparatus includes circuitry configured to receive, from either an output device or a server, a request for outputting an output target, and identify the output target based on the request. The request is generated by supplementing voice data. When the request is received from the server, the circuitry transmits the output target to a target output device designated, by the received request, to output the output target. When the request is received from the output device, the circuitry transmits the output target to the output device from which the request is received.

Yet another embodiment provides an information processing method executed by an information processing system including a server, an information processing apparatus, and an output device. The method includes acquiring voice data; supplementing the voice data with relating information so as to generate an output request in which at least the output device to output an output target is identified based on the voice data; and transmitting the output request to the output device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A and 5B are examples of a user management table and a device management table according to the first embodiment;

FIG. 11 is a flowchart illustrating an example of identification of a file to be transmitted according to the first embodiment;

Figure 1:
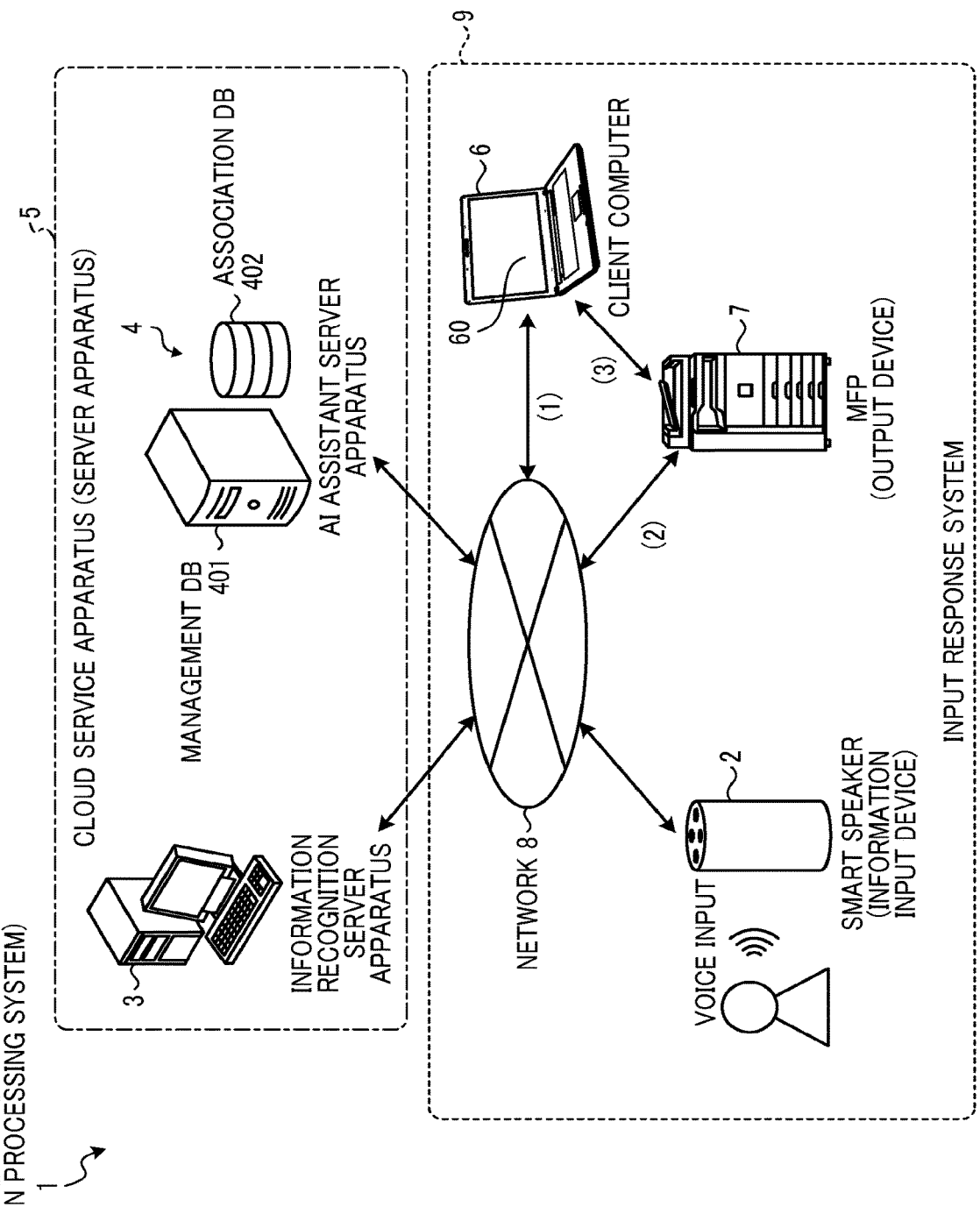
FIG. 1 is a diagram illustrating an example of a configuration of a voice control system according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, embodiments of this disclosure are described. As used herein, the singular forms "a," "an," and "the" are intended to include the plural forms as well, unless the context clearly indicates otherwise.

A description is given below of a voice control system as an example adopting aspects of an information processing system, an information processing method, an information processing apparatus, and an output device according to the present disclosure.

FIG. 1 is a diagram illustrating an example of a configuration of a voice control system according to a first embodiment. As illustrated in FIG. 1, a voice control system 1 according to the first embodiment includes a smart speaker 2, an information recognition server apparatus 3, an artificial intelligence (AI) assistant server apparatus 4, a client computer 6 (i.e., a personal computer), and one or more multifunction peripherals (MFPs) 7. The devices and the apparatus of the voice control system 1 are connected to each other, for example, via a network 8 such as a local area network (LAN).

The voice control system 1 is an example of an information processing system. The smart speaker 2 is equipped with AI that enables playback of various contents such as music and videos and output of weather information, news, and the like in response to input voice commands. The smart speaker 2 further has a capability of remotely controlling various devices such as lighting and home appliances. The information recognition server apparatus 3 has a capability of receiving voice data acquired via the smart speaker 2 and converting the voice data into text data. The AI assistant server apparatus 4 has a capability of processing the voice data acquired via the smart speaker 2 in cooperation with the information recognition server apparatus 3. A cloud service apparatus 5 includes the information recognition server apparatus 3 and the AI assistant server apparatus 4 connected to each other via the network 8. The cloud service apparatus 5 generates an execution command of a process such as printing and transmits the execution command to the MFP 7. The client computer 6 receives the print execution command and the like generated by the cloud service apparatus 5 and executes a predetermined process for the MFP 7.

The smart speaker 2 is an example of an information input device. At least one of the information recognition server apparatus 3 and the AI assistant server apparatus 4 constructing the cloud service apparatus 5 is an example of a server apparatus. The client computer 6 is an example of an information processing apparatus, and the MFP 7 is an example of an output device. The network 8 described above can be either a wired LAN or a wireless LAN. Note that the term "smart speaker" signifies, for example, a speaker that has an AI assistant function that responds to interactive voice input. Such a device recognizes voice command and the like with a built-in microphone and retrieves information or operates linked home appliances. The voice control system 1 can include two or more smart speakers 2.

The smart speaker 2 accepts, for example, input of operation by speech from a user (also referred to as an operator). Further, the smart speaker 2 functions as an information input device in the voice control system 1 that executes a predetermined process such as, printing, in the MFP 7 or issues an execution command of a process (e.g., print execution command) to the MFP 7, based on the information acquired by the voice command. Hereinafter, data including voice data (voice information) of the input voice accepted by the smart speaker 2 may be also simply referred to as voice data. The smart speaker 2 transmits such data via the network 8 to the information recognition server apparatus 3 (or the cloud service apparatus 5). Furthermore, the smart speaker 2 can have capabilities of a microphone and a camera for supplementing the data acquired from the accepted voice command and giving feedback to the user. In an embodiment of the present disclosure, a description is given of a case where a print execution command is transmitted to the MFP 7 based on the above-mentioned voice data.

The information recognition server apparatus 3 converts the voice data transmitted from the smart speaker 2 into text data. The information recognition server apparatus 3 is a first server apparatus.

The AI assistant server apparatus 4 is connected to the information recognition server apparatus 3 via the network 8 and constructs the above-described cloud service apparatus 5 together with information recognition server apparatus 3.

However, the smart speaker 2 or the client computer 6 can have a part or all of the functions of the cloud service apparatus 5. When the smart speaker 2 or the client computer 6 has all the functions of the cloud service apparatus 5, the cloud service apparatus 5 is not necessary in the voice control system 1. In such a case, the smart speaker 2 communicates with the client computer 6 without the cloud service apparatus 5. Then, the input response system 9 including the smart speaker 2, the client computer 6, and the MFP 7 serves as the voice control system 1. The client computer 6 can be, for example, a print management server including one or more servers.

In the description above, the cloud service apparatus 5 includes the information recognition server apparatus 3 and the AI assistant server apparatus 4. Alternatively, the AI assistant server apparatus 4 can have some or all of the functions of the information recognition server apparatus 3. Yet alternatively, the information recognition server apparatus 3 can have some or all of the functions of the AI assistant server apparatus 4. That is, the information recognition server apparatus 3 and the AI assistant server apparatus 4 can complement the functions with each other. Further, the cloud service apparatus 5 can be constructed of one server apparatus, or three or more server apparatuses.

Further, the AI assistant server apparatus 4 includes a management database (DB) 401 and an association database (DB) 402. For the management DB 401 and the association DB 402, for example, a storage unit such as a hard disk drive (HDD) of the cloud service apparatus 5 on the network 8 can be used. In addition, one or both of the management DB 401 and the association DB 402 can be stored in another server apparatus accessible by the cloud service apparatus 5 via the network 8.

The management DB 401 stores contents (data), such as, text data, image data, and voice data provided by the AI assistant server apparatus 4.

The data managed in the management DB 401 can be added or changed by, for example, the client computer 6 or the cloud service apparatus 5 on the network 8. The management DB 401 and the client computer 6 separate from each other in FIG. 1, but their functions can be implemented by one server. In this case, the server may be installed with a management program described later, transmits, to the management DB 401, a print execution command to the client computer 6 or the MFP 7, to acquire various data managed by the management DB 401.

The association DB 402 stores, for example, device identifications (IDs) of the smart speaker 2 as the information input device in association with output device IDs (e.g., MFP_#1 and MFP_#2) of the output devices including the MFP 7 each associated with the smart speaker 2. A detailed description of the association DB 402 is deferred.

The AI assistant server apparatus 4 converts the voice input via the smart speaker 2 into a command interpretable by the MFP 7 (e.g., a print execution command for the MFP 7) based on the intention of the user interpreted by the information recognition server apparatus 3. The AI assistant server apparatus 4 transmits the converted print execution command and the like to the client computer 6 via the network 8. The print execution command is generated, for example, based on the print instruction for the MFP 7 given by a voice command by the user via the smart speaker 2. The AI assistant server apparatus 4 is an example of second server apparatus. The print instruction is an example of an output request.

In the present embodiment, the management DB 401 and the association DB 402 are included in the AI assistant server apparatus 4. Alternatively, the management DB 401 and the association DB 402 can be separate from the AI assistant server apparatus 4. Yet alternatively, one of the management DB 401 and the association DB 402 can be included in the AI assistant server apparatus 4, and the other can be separate from the AI assistant server apparatus 4.

The client computer 6 transmits, to the target MFP 7, for example, a print execution command for the MFP 7 transmitted from the AI assistant server apparatus 4. The AI assistant server apparatus 4 (or the cloud service apparatus 5) and the client computer 6 communicate with each other via the network 8 described above.

Further, for example, the client computer 6 manages the output of the contents including the voice and the image (still images and moving images) in the MFP 7. Therefore, the client computer 6 stores and manages management data indicating at what time and which of users instructs printing of files to the MFP 7 and outputting of the contents, etc. The management data stored and managed by the client computer 6 is viewable from another client computer or the like connected via the network 8. Furthermore, the management data can be added or changed by the client computer 6 or the cloud service apparatus 5. In the present embodiment, the MFP 7 is mainly described as an example of the output device.

In the present embodiment, as described above, the cloud service apparatus 5 includes the two server apparatuses, the information recognition server apparatus 3 and the AI assistant server apparatus 4. However, each of the information recognition server apparatus 3 and the AI assistant server apparatus 4 can be implemented by a plurality of server apparatuses.

Hardware Configuration of Smart Speaker

Figure 2:
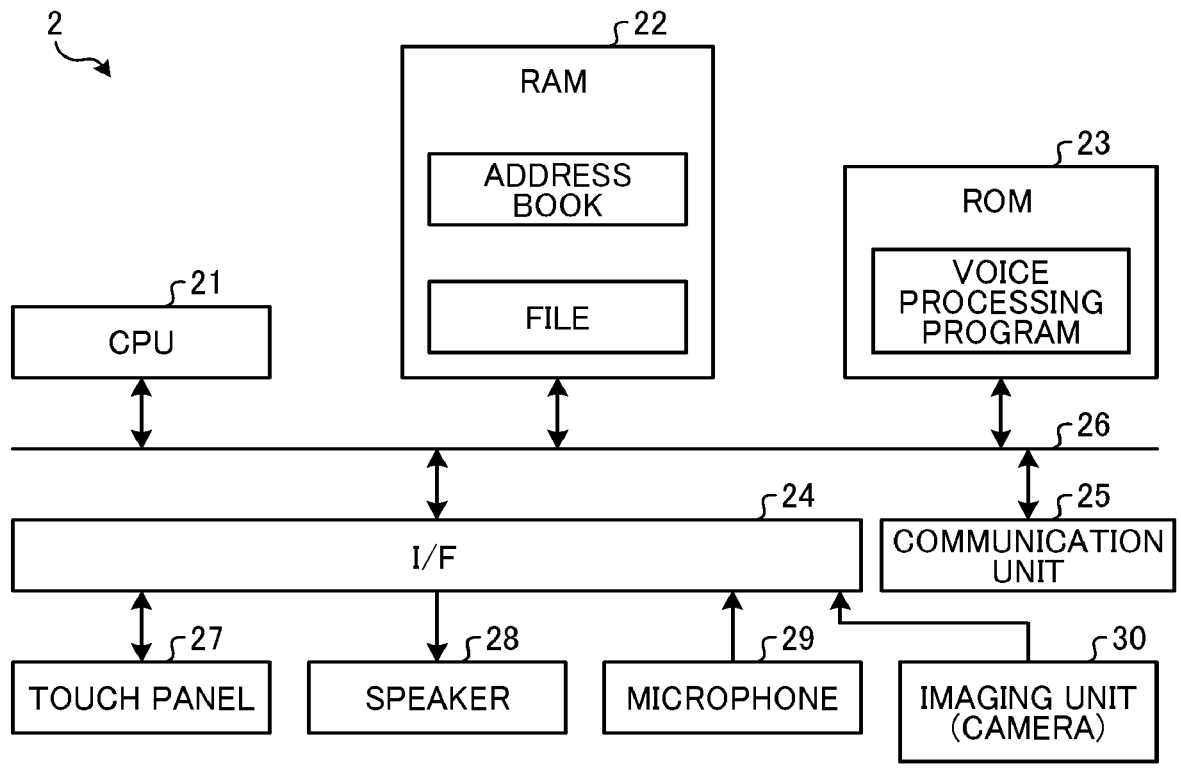
FIG. 2 is a block diagram illustrating an example of a hardware configuration of a smart speaker of the voice control system.

FIG. 2 is a block diagram illustrating an example of a hardware configuration of the smart speaker. As illustrated in FIG. 2, the smart speaker 2, which is an example of the information input device, includes hardware resources including a central processing unit (CPU) 21, a random access memory (RAM) 22, a read only memory (ROM) 23, an interface (I/F) 24, and a communication unit 25 that are connected with each other via an internal bus 26.

The CPU 21 is a control device that controls the entire smart speaker 2.

The RAM 22 functions as a work area for the CPU 21 to, for example, execute various processes according to the various programs downloaded from the ROM 23.

The ROM 23 stores an operation command processing program including a voice processing program and data that construct other various programs. By executing such processing programs, the CPU 21 enables the smart speaker 2 to perform processing to the MFP 7 by a voice command. In addition, the CPU 21 controls display of a touch panel 27, based on data acquired from the cloud service apparatus 5, audio output for feedback via a speaker 28, and image output.

The touch panel 27, the speaker 28, a microphone 29, and an imaging unit (camera) 30 are connected to the I/F 24.

The communication unit 25, implemented by a network interface circuit, for example, transmits the information acquired by the voice command by the user to the information recognition server apparatus 3 via the network 8. The communication unit 25 can communicate with other devices via the network 8 by either a wired connection or a wireless connection.

The internal bus 26 is a general-purpose bus that connects the CPU 21, the RAM 22, the ROM 23, the I/F 24, and the communication unit 25. The internal bus 26 can be any of bus types generally used for general-purpose devices such as smart speakers.

The touch panel 27 is, for example, a liquid crystal display (LCD) integral with a touch sensor. The user can designate a desired operation by touching a touch key or the like on the LCD of the touch panel 27.

The speaker 28 provides voice feedback for prompting the user to input supplementary information.

The microphone 29 acquires, for example, the data of the voice input by the user in order to perform printing in the MFP 7 in response to the voice. The acquired voice data is transmitted to the information recognition server apparatus 3 via the communication unit 25, and converted into text data by the information recognition server apparatus 3.

The imaging unit (camera) 30 captures an image of the user who uses the smart speaker 2 and other images. The captured image is transmitted to the information recognition server apparatus 3 via the communication unit 25 as moving image data or still image data (hereinafter, simply referred to as image data).

Figure 3:
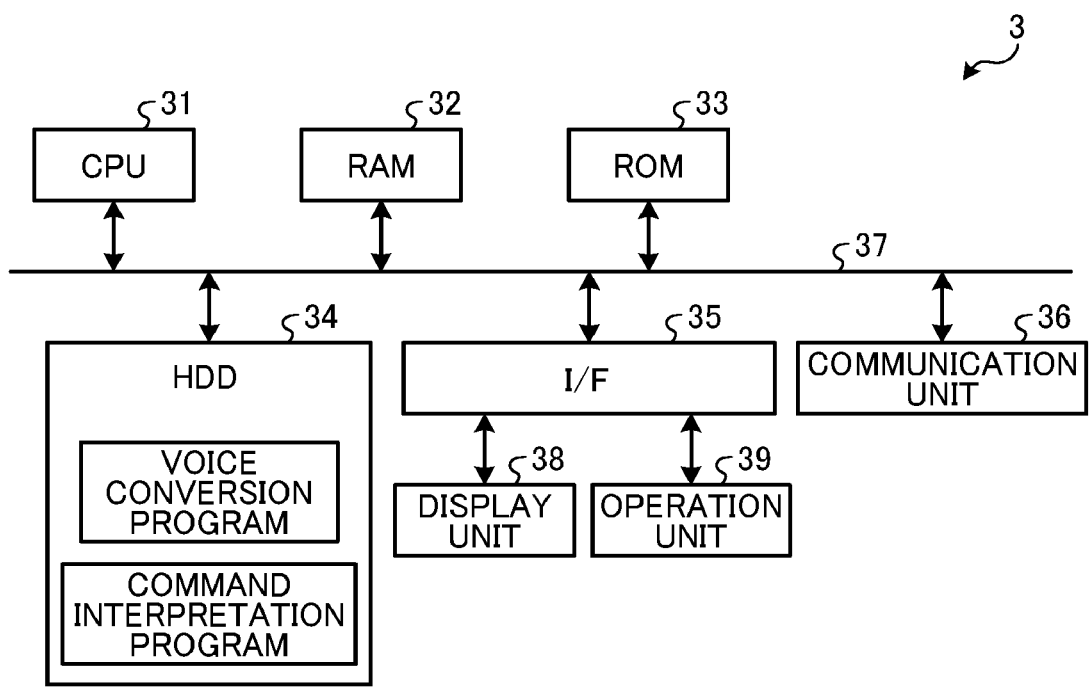
FIG. 3 is a diagram illustrating an example of a hardware configuration of an information recognition server apparatus illustrated in FIG. 1.

Hardware Configuration of Information Recognition Server Apparatus FIG. 3 is a diagram illustrating an example of a hardware configuration of the information recognition server apparatus. As illustrated in FIG. 3, the information recognition server apparatus 3 includes hardware resources including a CPU 31, a RAM 32, a ROM 33, a hard disk drive (HDD) 34, an I/F 35, and a communication unit 36, which are connected to each other via an internal bus 37. A display unit 38 and an operation unit 39 are connected to the I/F 35.

The HDD 34 stores data constructing a voice conversion program and a command interpretation program. The voice conversion program converts, for example, voice data received from the smart speaker 2 into text data. Next, the command interpretation program determines whether the converted text data matches predefined dictionary data. In determining the matching with the dictionary data, when the text data matches the dictionary data, the program converts the text data into an intent indicating an intention of the user and a parameter indicating a variable of an execution setting of a predetermined process. After that, the voice conversion program transmits, to the AI assistant server apparatus 4, an intent indicating an intention of the user and a parameter indicating a variable of an execution setting of a predetermined process.

The CPU 31 executes various programs including a voice conversion program and the like. That is, the information recognition server apparatus 3 functions as a device that receives voice data and analyzes the voice. The voice conversion program can be executed by one server apparatus or different server apparatuses. These programs can be executed in cooperation with a plurality of server apparatuses.

The RAM 32 functions as a work area to which, for example, various programs stored in a storage unit such as the ROM 33 are downloaded and in which various processes are executed by the CPU 31.

The ROM 33 stores data constructing other programs than the programs stored in the HDD 34. The CPU 31 can execute various programs stored in the ROM 33 to control the smart speaker 2 and the AI assistant server apparatus 4.

The communication unit 36, implemented by a network interface circuit, for example, receives, from the smart speaker 2, the data of the voice input by the user. The communication unit 36 can communicate with other devices via the network 8 by either a wired connection or a wireless connection.

The internal bus 37 is a general-purpose bus that connects the CPU 31, the RAM 32, the ROM 33, the HDD 34, the I/F 35, and the communication unit 36. The internal bus 37 can be of any bus type as long as the information recognition server apparatus 3 functions as a server.

The display unit 38 is, for example, an LCD and displays various statuses of, for example, the information recognition server apparatus 3.

The operation unit 39 is, for example, a so-called touch panel including an LCD integral with a touch sensor. For instructing a desired operation on the operation unit 39, the operator (user) touches an operation button (software key) or the like displayed on the operation unit 39, thereby designating the desired operation.

The operation command processing program including the voice processing program can be provided as a file of either an installable or executable format and recorded on a recording medium, such as a compact disc read only memory (CD-ROM) and a flexible disk (FD), readable by a computer. The computer-readable recording medium can be a compact disc-recordable (CD-R), a digital versatile disk (DVD), a Blu-ray Disc (registered trademark), or a semiconductor memory. Alternatively, the program can be installed via a network such as the Internet or preliminarily incorporated in a storage unit such as a ROM of the information recognition server apparatus 3.

Hardware Configuration of AI Assistant Server Apparatus

Figure 4:
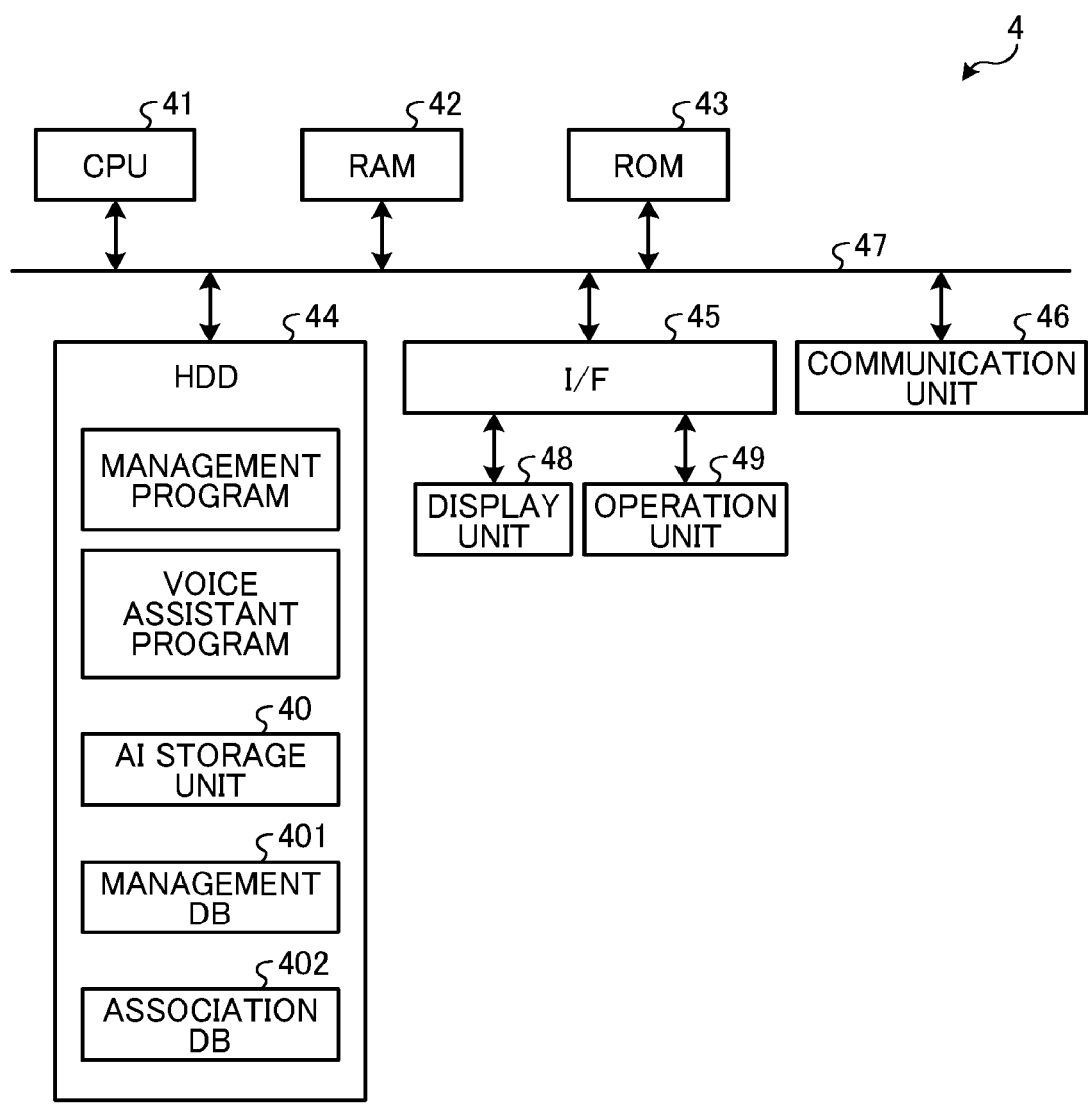
FIG. 4 is a diagram illustrating an example of a hardware configuration of an artificial intelligence (AI) assistant server apparatus illustrated in FIG. 1.

FIG. 4 is a diagram illustrating an example of a hardware configuration of the AI assistant server apparatus. As illustrated in FIG. 4, the AI assistant server apparatus 4 includes hardware resources including a CPU 41, a RAM 42, a ROM 43, an HDD 44, an I/F 45, and a communication unit 46, which are mutually connected via an internal bus 47. A display unit 48 and an operation unit 49 are connected to the OF 45.

The HDD 44 includes an AI storage unit 40 that stores dictionary data for interpreting a print execution command given by voice from the user. The dictionary data includes entity information, action information, and intent information, which will be described later. Further, the HDD 44 stores a user management table 402a (illustrated in FIG. 5A) and a device management table 402b (illustrated in FIG. 5B) described below. Although predetermined setting values are given in advance to these tables, additions and changes can be made as appropriate. An outline of the user management table 402a and the device management table 402b are described below.

FIGS. 5A and 5B are examples of the user management table and the device management table. The AI assistant server apparatus 4 stores, in a storage unit such as the HDD 44, the association DB 402 constructed of the user management table 402a and the device management table 402b illustrated in FIGS. 5A and 5B. In the user management table 402a, a user name and a user ID associated with each other are stored for each ID of the information input device. In the device management table 402b, for each information input device name, the ID of the information input device, an information processing apparatus name, the device ID of the information processing apparatus, connection information of the information processing apparatus, an output device name, the device ID of the output device, and connection information of the output device are managed in association with each other.

The ID of the information input device is an example of device identifier information for identifying the smart speaker 2 as an example of the information input device. That is, the device ID is an example of device identification information for identifying the information input device. Further, instead of or in addition to the ID of the information input device, an information input device name indicating the name of the information input device can be managed.

The output device name is the name of the output device that performs printing according to a print execution command based on the voice input via the smart speaker 2 used by the user. Alternative to the MFP 7 described above, the output device name can be the name of any one of a projector, an electronic whiteboard, a video conference/Web conference system, a digital signage, and the like, which will be described later. The information processing apparatus name is the name of the client computer used by the user.

The device ID of the output device is an example of the device identification information for identifying the output device described above. The device ID of the information processing apparatus is information for identifying the client computer. In the storage unit such as the HDD 44, the connection information of the above-described information processing apparatus is stored for each client computer 6, and the connection information of the output device is allocated for each MFP 7. Each connection information is information necessary for connecting and communicating with that device. For example, the connection information is address information.

The device management table 402b can be configured to allow registration of a user ID of an unregistered user (new user) in association with a device ID of an information input device used by the user, and a device ID of an output device designated by the user.

The CPU 41 converts an interpretation result generated (converted) by the information recognition server apparatus 3 into data such as a print execution command for the MFP 7 and transmits the data to the client computer 6 via the network 8. Note that the intention instructed by the user includes: for example, a print instruction and various instructions to the MFP 7; and startup of a projector, an electronic whiteboard, a video conference/Web conference system, and a digital signage. In this way, the client computer 6 can be operated by the voice command input via the smart speaker 2.

The RAM 42 functions as a work area to which, for example, various programs stored in a storage unit such as the HDD 44 are downloaded and in which various processes are executed by the CPU 41.

The ROM 43 stores, for example, data constructing various programs other than the programs stored in the HDD 44.

Further, the AI assistant server apparatus 4 includes the management DB 401 and the association DB 402 in the HDD 44. The management DB 401 stores, for example, text data, image data, voice data, and the like indicating the content provided by the AI assistant server apparatus 4 as the cloud service apparatus 5. For example, the association DB 402 further stores the following information, assuming that a plurality of smart speakers 2 are used. The information is, for example, information that associates the device ID identifying each smart speaker 2 with the device ID of the MFP 7 that executes printing or the like according to the voice command input to smart speaker 2. That is, the association DB 402 stores, the device ID of each smart speaker 2 and the device ID of the client computer 6 in association with each other, to be able to identify the MFP 7 usable by the voice input to each smart speaker 2.

For the management DB 401 and the association DB 402, a storage unit such as a hard disk drive (HDD) of the cloud service apparatus 5 on the network 8 can be used. In addition, one or both of the management DB 401 and the association DB 402 can be stored in another server apparatus accessible by the cloud service apparatus 5 via the network 8.

The communication unit 46, which may be implemented by a network interface circuit, for example, transmits and receives data to and from the information recognition server apparatus 3 and the client computer 6 via the network 8. The communication unit 46 can communicate with other devices via the network 8 by either a wired connection or a wireless connection.

The internal bus 47 is a general-purpose bus that connects the CPU 41, the RAM 42, the ROM 43, the HDD 44, the I/F 45, and the communication unit 46. The internal bus 47 can be of any bus type as long as the AI assistant server apparatus 4 functions as a server.

The display unit 48 is, for example, an LCD and displays, for example, various statuses of the AI assistant server apparatus 4.

The operation unit 49 is, for example, a so-called touch panel including an LCD integral with a touch sensor. For instructing a desired operation on the operation unit 49, the operator (user) touches an operation button (software key) or the like displayed on the operation unit 49, thereby designating the desired operation.

Hardware Configuration of Cloud Service Apparatus

As described above, the cloud service apparatus 5 is, for example, a combination of the information recognition server apparatus 3 and the AI assistant server apparatus 4, and is connected to the smart speaker 2 and the client computer 6 via the network 8, respectively. The hardware configuration of the cloud service apparatus 5 is described above as configurations of the information recognition server apparatus 3 and the AI assistant server apparatus 4.

Hardware Configuration of Client Computer

Figure 6:
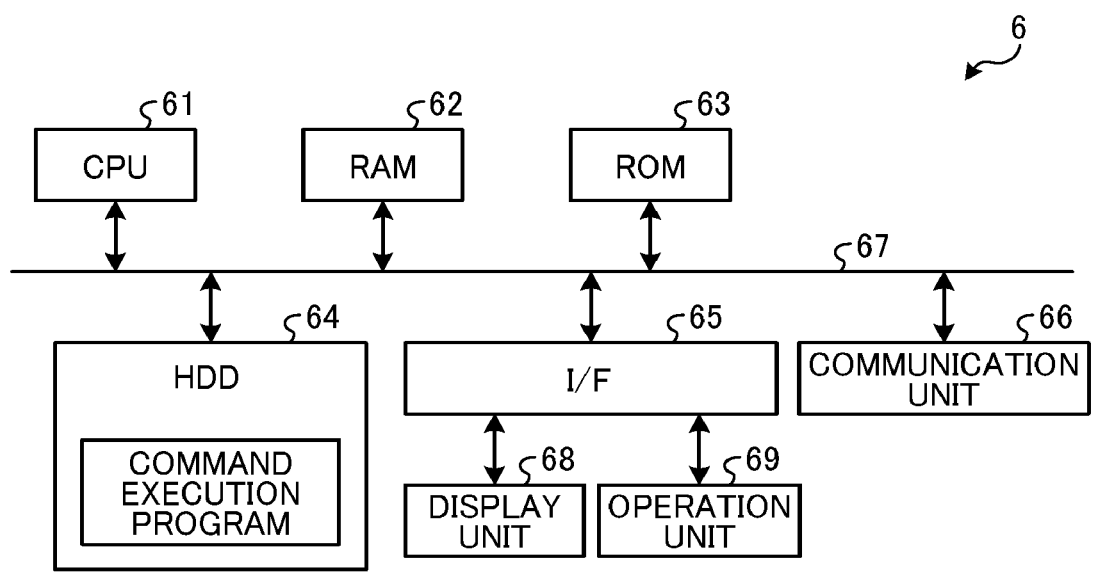
FIG. 6 is a diagram illustrating an example of a hardware configuration of a client computer illustrated in FIG. 1.

FIG. 6 is a block diagram illustrating an example of a hardware configuration of the client computer. As illustrated in FIG. 6, the client computer 6 includes hardware resources including a CPU 61, a RAM 62, a ROM 63, an HDD 64, an I/F 65, and a communication unit 66, which are mutually connected via an internal bus 67. A display unit 68 and an operation unit 69 are connected to the I/F 65.

The CPU 61 is a control device that controls the entire client computer 6.

The RAM 62 functions as a work area to which various programs stored, for example, in the ROM 63 are downloaded and in which various processes are executed by the CPU 61.

The ROM 63 stores, for example, data that constructs a program for controlling the client computer 6 itself. The CPU 61 executes, for example, a program for controlling the client computer 6 itself, to control communication with the cloud service apparatus 5 (or the AI assistant server apparatus 4).

The HDD 64 stores data that constructs the command execution program. The CPU 61 develops the command execution program in the RAM 62 and executes the program to perform, for example, print process of the MFP 7 which is an example of the output device. The command execution program is a first program in the present embodiment.

The communication unit 66 receives a print execution command or the like from the cloud service apparatus 5 (or the AI assistant server apparatus 4). The communication unit 66 transmits the print execution command and the like to the MFP 7 via the network 8.

The internal bus 67 is a general-purpose bus that connects the CPU 61, the RAM 62, the ROM 63, the HDD 64, the I/F 65, and the communication unit 66. The internal bus 67 can be of any bus type as long as the client computer 6 can execute the command execution program.

Hardware Configuration of MFP

Figure 7:
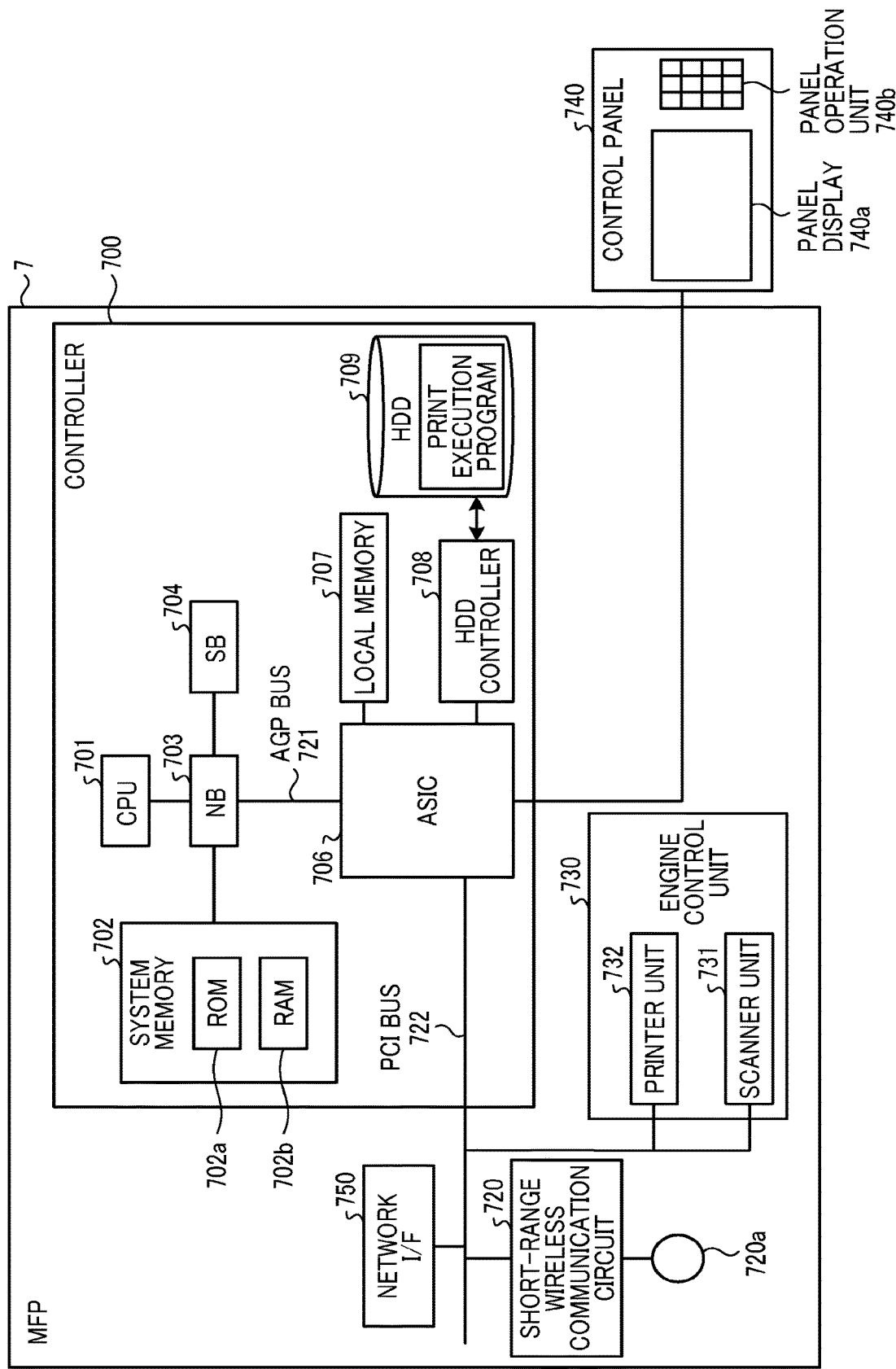
FIG. 7 is a block diagram illustrating an example of a hardware configuration of a multifunction peripheral (MFP)

FIG. 7 is a block diagram illustrating an example of a hardware configuration of the MFP. The MFP 7 includes a controller 700, a short-range wireless communication circuit 720, an engine control unit 730, a control panel 740, and a network I/F 750.

The controller 700 controls, for example, inputs from the control panel 740. Further, the controller 700 includes a CPU 701 that controls the entire MFP 7, a system memory 702, a north bridge (NB) 703, a south bridge (SB) 704, an application-specific integrated circuit (ASIC) 706, a local memory 707 which is a storage unit, an HDD controller 708, and an HDD 709 which is a storage unit. The NB 703 and the ASIC 706 are connected by an Accelerated Graphics Port (AGP) bus 721.

The NB 703 is a bridge circuit for connecting the CPU 701 to the system memory 702, the SB 704, and the ASIC 706. The NB 703 includes a memory controller that controls reading and writing from and to the system memory 702, a peripheral component interconnect (PCI) master, and an AGP target.

The system memory 702 includes a ROM 702a that is a memory storing programs and data for implementing each function of the controller 700, and a RAM 702b that is used for developing programs and data. The RAM 702b is also used as a drawing memory in memory printing. For the purpose of distribution, the program stored in the RAM 702b can be stored in any computer-readable recording medium, such as a CD-ROM, a CD-R, or a DVD, in a file format installable or executable by a computer.

The SB 704 is a bridge circuit for connecting the NB 703 to a PCI device and a peripheral device.

The ASIC 706 is an integrated circuit (IC) used for image processing and has a hardware element for image processing. The ASIC 706 functions as a bridge circuit that connects the AGP bus 721, the PCI bus 722, the HDD controller 708, and the local memory 707 to each other. The ASIC 706 includes an arbiter (ARB) that arbitrates the operation and timing of the PCI target and AGP master, and other devices connected to the ASIC 706; a memory controller to control the local memory 707; a direct memory access controller (DMAC) that controls DMA control; and a PCI unit that performs data transfer between a scanner unit 731 and a printer unit 732 via the PCI bus 722.

The ASIC 706 can be configured to connect to a universal serial bus (USB) interface, the Institute of Electrical and Electronics Engineers 1394 (IEEE1394) interface, or both.

The local memory 707 is used as an image buffer for copying or a code buffer.

The HDD 709 is a storage for accumulating image data, font data used in printing, and forms. The HDD controller 708 controls reading or writing of data in the HDD 709 under the control of the CPU 701.

The AGP bus 721 is a bus interface for a graphics accelerator card proposed for speeding up graphics processing. The AGP bus 721 can speed up the graphics accelerator card by directly accessing the system memory 702 with high throughput.

The short-range wireless communication circuit 720 is a circuit for short-range wireless communication and includes a short-range wireless communication circuit antenna 720a. The short-range wireless communication circuit 720 is a communication circuit in compliance with the near field communication (NFC), the Bluetooth (registered trademark), and the like.

The engine control unit 730 includes a scanner unit 731 and a printer unit 732. The scanner unit 731 and the printer unit 732 include image processing units for, for example, error diffusion and gamma conversion.

The control panel 740 is mountable on or connectable to the MFP 7, and includes a panel display 740a and a panel operation unit 740b. The present embodiment presents, as an example, a status connectable to the MFP 7. The panel display 740a displays, for example, current setting values and selection screens and accepts instructions from users. The panel display 740a is, for example, a touch panel. The panel operation unit 740b also includes a numeric keypad that receives set values of various settings, such as density setting, relating to image formation and a start key that receives a copy start instruction.

The network I/F 750 is an interface for data communication via the communication network. The short-range wireless communication circuit 720 and the network I/F 750 are electrically connected to the ASIC 706 via the PCI bus 722.

The MFP 7 can switch among a document server function, a copy function, a printer function, and a facsimile function by an application switching key displayed on the panel display 740a or on the panel operation unit 740b. When the document server function is selected, the MFP 7 enters a document server mode to store document data. With selection of the copy function, the MFP 7 enters a copy mode. With selection of the print function, the MFP 7 enters a printer mode. With selection of the facsimile function, the MFP 7 enters a facsimile mode.

Functional Configuration of Voice Control System

Figure 8:
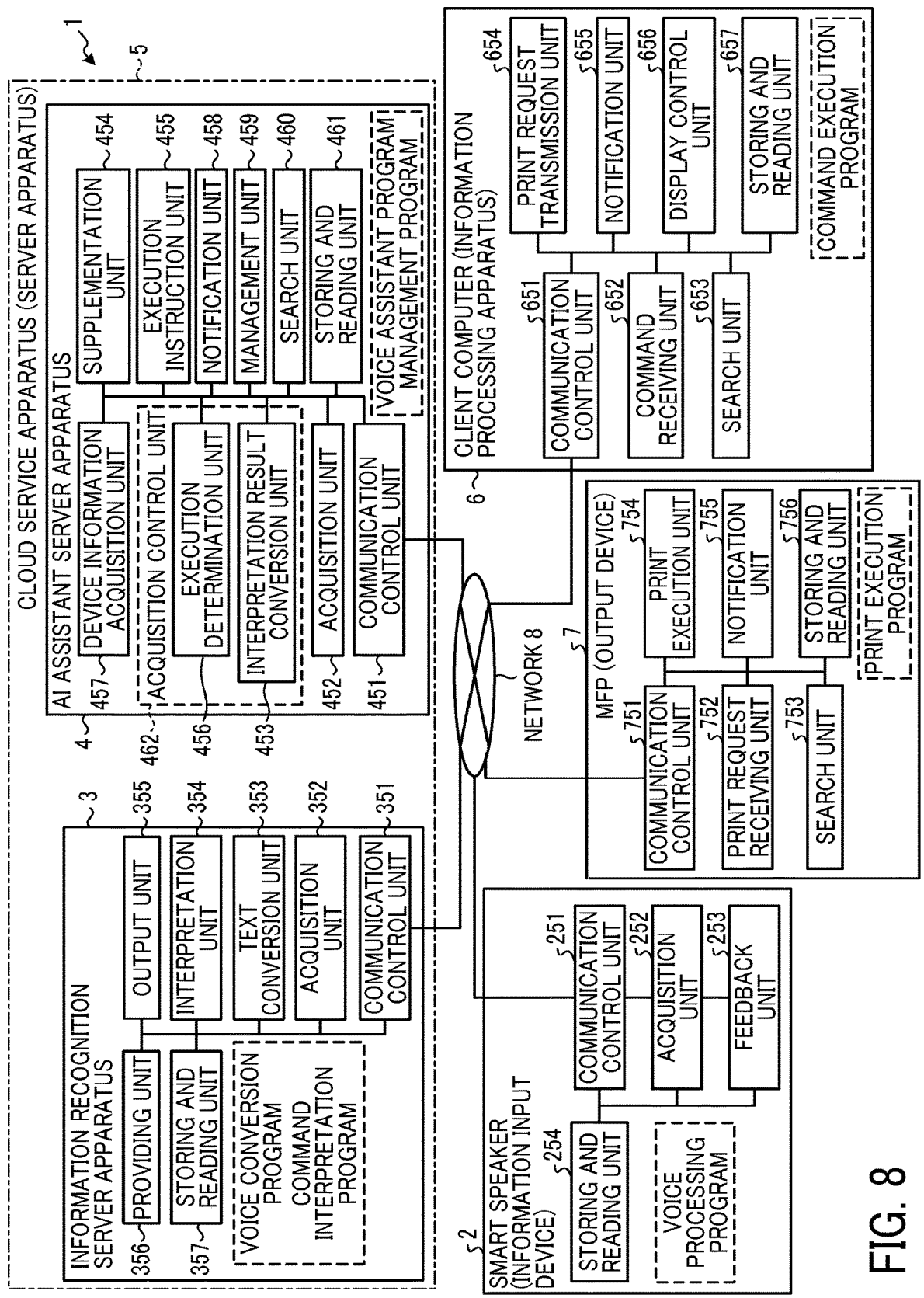
FIG. 8 is a block diagram illustrating an example of functional blocks of apparatus and devices included in the voice control system.

FIG. 8 is a block diagram illustrating an example of functional blocks of the devices constructing the voice control system. As illustrated in FIG. 1, the voice control system 1 includes the smart speaker 2, the cloud service apparatus 5 including the information recognition server apparatus 3 and the AI assistant server apparatus 4, the client computer 6, and the MFP 7, which are connected to each other via the network 8.

Functional Configuration of Smart Speaker

The smart speaker 2 performs data communication with the information recognition server apparatus 3 and the AI assistant server apparatus 4, constructing the cloud service apparatus 5, to transmit and receive data such as voice data, image data, and text data thereto and therefrom.

The CPU 21 of the smart speaker 2 illustrated in FIG. 2 deploys, in the RAM 22, the voice command processing program or the like, as the operation command processing program, stored in the storage unit such as the ROM 23 and executes the program. Thus, the CPU 21 functions or implements units functioning as, for example, a communication control unit 251, an acquisition unit 252, a feedback unit 253, and the storing and reading unit 254 (hereinafter, also collectively referred to as the communication control unit 251 to the storing and reading unit 254).

Next, each functional unit of the smart speaker 2 is described. The communication control unit 251 controls communication between the smart speaker 2 and the information recognition server apparatus 3 or the cloud service apparatus 5 via the network 8, for transmission and reception of various data or information. At that time, the communication control unit 251 controls the communication unit 25 of the smart speaker 2 to transmit and receive various data or information. The communication control unit 251 transmits, to the information recognition server apparatus 3 (or the cloud service apparatus 5), information based on a predetermined operation and an instruction performed by the user to the smart speaker 2. The information is acquired by the acquisition unit 252 described below. Further, the communication control unit 251 acquires text data, image data, voice data, etc. from the cloud service apparatus 5 for feedback. Furthermore, the communication control unit 251 also transmits a device ID that identifies the smart speaker 2 when transmitting, to the information recognition server apparatus 3 (or the cloud service apparatus 5), information relating to the predetermined operation and the instruction by the user.

As described above, the communication control unit 251 controls communication between the smart speaker 2 and another device connected via the network 8 such as a LAN. For such communication, for example, a communication protocol such as Ethernet (registered trademark) generally used in a LAN is used. The communication control unit of each of the information recognition server apparatus 3, the AI assistant server apparatus 4, the cloud service apparatus 5, the client computer 6, and the MFP 7 described later functions similar to the communication control unit 251.

The acquisition unit 252 is an example of a voice data acquisition unit. As the user instructs operation by speech, which is collected via the microphone 29, the acquisition unit 252 acquires the instructing voice. The acquisition unit 252 can also acquire an instructing action including tapping by the user or a mechanical operation such as pressing of a physical switch. That is, the acquisition unit 252 acquires at least one of voice command and information representing an instruction, such as an instructing action. The information representing the above-mentioned instruction is referred to as instruction information. The instructing voice of the user includes, for example, information for generating a print execution command for causing an output device, such as the MFP 7, to execute printing and an execution command for executing various processes.

The acquisition unit 252 executes the operation command processing program described above to acquire the voice data given by the user and transmits the voice data to the information recognition server apparatus 3 (or the cloud service apparatus 5). Further, the acquisition unit 252 cooperates with the feedback unit 253 to display the data (voice data, image data, text data, etc.) acquired from the cloud service apparatus 5 on the touch panel 27, or orally outputs the data via the speaker 28, as notification to the user. The touch panel 27 can be integral with the smart speaker 2 or can be separate therefrom. When separate from the smart speaker 2, the touch panel 27 can include a wireless communication interface necessary for wireless communication with the smart speaker 2 and the like.

The feedback unit 253 functions so that the smart speaker 2 responds to the user, as necessary, for performing printing or a predetermined process in the MFP 7 based on the voice command from the user. With the feedback unit 253, an interactive system according to the present embodiment is realized. Further, in order to realize an operation by voice input in the interactive system, when the voice command from the user or instruction image is insufficient, the feedback unit 253 performs voice feedback in order to supplement the data. Further, the feedback unit 253 can display, on the screen of the touch panel 27, a text, voice, or image to be fed back to the user. The details of the interactive operation and feedback by the feedback unit 253 are described later.

The storing and reading unit 254 performs, for example, storing of various data in the ROM 23 and reading of various data such as the operation command processing program stored in the ROM 23.

In the present embodiment, the communication control unit 251 to the storing and reading unit 254 can be implemented by software. In addition, the communication control unit 251 to the storing and reading unit 254 can cause another program to execute a part of the processing, or can cause the other program to indirectly execute the processing. Further, the communication control unit 251 to the storing and reading unit 254 can be partially or entirely implemented by hardware such as an IC.

Functional Configuration of Information Recognition Server Apparatus

The information recognition server apparatus 3 analyzes the voice data or the like received from the smart speaker 2 and converts the data into text data. The intention of the user is interpreted based on the text data and the dictionary data registered in advance. The interpretation result is transmitted to the AI assistant server apparatus 4.

The CPU 31 of the information recognition server apparatus 3 deploys the voice conversion program and the like stored in the storage unit such as the HHD 34 into the RAM 32 and executes the program in accordance with the voice data and the like given by the user via the smart speaker 2. When any of these programs is executed, the CPU 31 functions or implements units functioning as, for example, a communication control unit 351, an acquisition unit 352, a text conversion unit 353, an interpretation unit 354, an output unit 355, a providing unit 356, and a storing and reading unit 357 (hereinafter, also referred to as the communication control unit 351 to the storing and reading unit 357).

Next, a description is given of each functional unit of the information recognition server apparatus 3. The communication control unit 351 controls communication between the smart speaker 2 or the artificial intelligence (AI) assistant server apparatus 4 via the network 8, for transmission and reception of various data or information. Specifically, the communication control unit 351 controls the communication unit 36 of the information recognition server apparatus 3, to receive the voice data given by the user and transmit the text data to the smart speaker 2 (information input device).

The acquisition unit 352 acquires information based on a predetermined operation and instruction transmitted from the smart speaker 2 (information input device). The acquisition unit 352 can also acquire information based on a user operation of the touch panel, a button, a switch, or the like of the smart speaker 2.

The text conversion unit 353 is an example of a voice recognition unit and an image recognition unit, and converts the voice data given by the user into text data.

The interpretation unit 354 interprets an instruction from the user based on the text data. Specifically, the interpretation unit 354 determines whether a word or the like included in the text data matches the dictionary data based on the dictionary data provided by the voice assistant program. In a case of matching with the dictionary data, the interpretation unit 354 converts the data into an intent indicating an intention of the user and a parameter indicating a variable of an execution setting of a predetermined process. The interpretation unit 354 transmits the intent and the parameter to the management program. At this time, the interpretation unit 354 also transmits the device ID of the smart speaker 2 for identifying the device that has acquired the voice data, to the AI assistant server apparatus 4.

The output unit 355 controls the communication unit 36 to transmit data such as text data, voice data, and image data to the smart speaker 2.

Further, the CPU 31 functions as the providing unit 356 by executing the voice assistant program stored in the storage unit such as the HDD 34.

The providing unit 356 can interpret the operation command from the user based on the text data. Specifically, the providing unit 356 acquires the text data from the voice conversion program, determines whether a word or the like in the text data matches the dictionary data, and converts the text data into an intent and a parameter when there is a match with the dictionary data. After that, the providing unit 356 provides the intent and the parameter to the voice conversion program.

The storing and reading unit 357 performs, for example, read-out of data constructing various programs such as the voice conversion program stored in the ROM 33.

In the present embodiment, the communication control unit 351 to the storing and reading unit 357 can be implemented by software. Further, the communication control unit 351 to the storing and reading unit 357 can cause another program to execute a part of the processing, or can cause the other program to indirectly execute the processing. For example, a part or all of the functions of the interpretation unit 354 of the voice conversion program can be executed by the voice assistant program. Furthermore, some or all of the functions of the interpretation unit 354 of an operation image conversion program can be executed by the image assistant program. In these cases, a voice assistant application, an image assistant application, or the like can, for example, determine whether a word in the text data matches the dictionary data, and convert the data into an intent and a parameter in a case of matching with the dictionary data. The intent indicates an intention of the user, and the parameter indicates a variable of an execution setting of a predetermined process. Further, the interpretation unit 354 can acquire the intent and the parameter from the voice assistant program or the like. Further, some or all of the communication control unit 351 to the storing and reading unit 357 can be implemented by hardware such as an IC.

Further, in the above-described example, the providing unit 356 is implemented by software, but a part or all of the providing unit 356 can be implemented by hardware such as an IC, similar to the above-described programs.

Functional Configuration of AI Assistant Server Apparatus

The AI assistant server apparatus 4 acquires, for example, the intent and the parameters acquired by the voice conversion program executed by the information recognition server apparatus 3, and the device ID of the smart speaker 2. Then, the AI assistant server apparatus 4 performs processing of each function described later.

Further, the AI assistant server apparatus 4 converts the interpretation result received from the information recognition server apparatus 3 into data such as a print execution command for the MFP 7 in a format interpretable by the client computer 6. Then, the AI assistant server apparatus 4 transmits the data such as the converted print execution command to the client computer 6 or the MFP 7. The MFP 7 executes a predetermined process according to the print execution command or the like transmitted from the client computer 6. The description above concerns transmitting the print execution command to the client computer 6. Alternatively, in a system including another server apparatus that manages the MFP 7, the AI assistant server apparatus 4 can transmit an execution command of the processing executed by the MFP 7 to such a server apparatus.

The CPU 41 of the AI assistant server apparatus 4 acquires, via the network 8, the management program stored in the storage unit such as the HDD 34 of the information recognition server apparatus 3, deploys the program into the RAM 42, and executes the program. By executing the management program, the CPU 41 functions or implements units functioning as, for example, a communication control unit 451, an acquisition unit 452, an interpretation result conversion unit 453, a supplementation unit 454, an execution instruction unit 455, an execution determination unit 456, a device information acquisition unit 457, a notification unit 458, a management unit 459, a search unit 460, and a storing and reading unit 461 (hereinafter, also referred to as the communication control unit 451 to the storing and reading unit 461).

Next, a description is given of each functional unit of the AI assistant server apparatus 4. The communication control unit 451 controls the communication unit 46 (see FIG. 4), to transmit the interpretation result to the smart speaker 2 (information input device) and receive the text data relating to the voice data given by the user.

The acquisition unit 452 acquires the intent and the parameter transmitted from the information recognition server apparatus 3, and the device ID of the smart speaker 2 (information input device).

The interpretation result conversion unit 453 converts the interpretation result of the intent and the parameter converted by the voice conversion program into a print execution command or the like that can be interpreted by the client computer 6 or the MFP 7. The interpretation result conversion unit 453 is one of the functions of the management program executed by the AI assistant server apparatus 4 (or the cloud service apparatus 5). The print execution command that can be interpreted by the client computer 6 or the MFP 7 is an example of information (processing information) for executing processing for the MFP 7.

Referring to the user management table 402*a* and the device management table 402*b*, the supplementation unit 454 supplements the execution command converted by the interpretation result conversion unit 453, that is, adds information necessary for processing in the MFP 7 (an example of the output device). The information necessary for the processing is, for example, information necessary for conversion into a print execution command or the like for the MFP 7.

The execution instruction unit 455 transmits the print execution command or the like converted by the interpretation result conversion unit 453 to the client computer 6 that manages the MFP 7, thereby instructing execution of the command. That is, the execution instruction unit 455 searches the association DB 402 for the MFP 7 associated with the device ID that identifies the smart speaker 2 used by the user, and transmits a print execution command, etc., together with the intent and the parameter, to the client computer 6 that manages the MFP 7. That is, the execution instruction unit 455 can identify the client computer 6 associated with the device ID from the association DB 402.

The device information acquisition unit 457 acquires device information about, such as, status of communication connection between the client computer 6 and the MFP 7, a power usage status relating to turning on and off of the power of the MFP 7, and a power supply status (e.g., normal mode and energy saving mode) to the MFP 7. The device information acquisition unit 457 stores the device information acquired from the MFP 7 in the storage unit such as the HDD 44 and manages the device information, in association with the device ID identifying the MFP 7. The storage destination of the device information can be the device management table 402*b*, which is to be described later, that constructs the association DB 402. Furthermore, the device information acquisition unit 457 also has a capability of referring to the device management table 402*b* and supplementing information relating to generation of a print execution command executed by the MFP 7.

The execution determination unit 456 compares the status of the MFP 7 indicated by the acquired device information with the print instruction or the predetermined process contents designated by the user, thereby determining whether the print instruction designated by the user or the print execution command is feasible in the MFP 7. The processing according to the print instruction or the predetermined process designated by the user include, for example, determination of whether or not the MFP 7 is usable in the time period designated by the user, change of the power status of the MFP 7, and execution of printing in the MFP 7. Further, in response to a determination that the print instruction or the print execution command designated by the user is executable, the execution determination unit 456 causes the interpretation result conversion unit 453 to transmit the print execution command (an example of output request) to the client computer 6 that manages the MFP 7. By contrast, in response to a determination that execution is not feasible, the execution determination unit 456 feedbacks response information, such as an error message, to the smart speaker 2 via the voice conversion program or the like. In the present embodiment, alternatively, he execution determination unit 456 can directly transmit the print execution command or the like transmitted from the interpretation result conversion unit 453 to the MFP 7 or the like via the network 8 without communicating with the client computer 6. Such an example will be described in detail in a second embodiment.

The notification unit 458 notifies the voice conversion program of the text data, the voice data, the image data, and the like as a response to the print instruction or the print execution command from the user. Further, when the print instruction to the MFP 7, the command for executing the predetermined process, or the parameter indicating the execution setting of the predetermined process is insufficient, the notification unit 458 performs feedback to the smart speaker 2 via the voice conversion program or the like. That is, the notification unit 458 prompts the user to input a missing parameter. The notification unit 458 can transmit predetermined parameter information to the smart speaker 2 as information necessary to confirm the missing parameter; or text data, voice data, or image data to the smart speaker 2 as information necessary to prompt the user of designation of the parameter. Through the above-described process, the user can know what kind of information is absent by the voice from the smart speaker 2.

The management unit 459 registers, in the association DB 402, the device ID of the smart speaker 2 in association with the device ID of the MFP 7 managed by the client computer 6 based on the information input to the client computer 6, or a client device connected to the smart speaker 2 or the cloud service apparatus 5. In the association DB 402, association information associating the device ID of the smart speaker 2 with the device ID of the MFP 7 and association information associating the device ID of the MFP 7 with the device ID of the client computer 6 are stored and managed as the device management table 402*b*. Further, in the association DB 402, association information associating the device ID of the smart speaker 2 with the device ID of the client computer 6 can be managed. The search unit 460 searches for and identifies the MFP 7 based on the device ID and the user ID.

The storing and reading unit 461 performs reading of various data stored in the storage unit such as the HDD 44 of the AI assistant server apparatus 4 and writing of various data into the storage unit such as the HDD 44.

In the present embodiment, the communication control unit 451 to the storing and reading unit 461 are implemented by software, but some or all of these can be implemented by hardware such as an IC. Further, the functions implemented by the communication control unit 451 to the storing and reading unit 461 can cause another program stored in the storage unit, such as the HDD 34, of the information recognition server apparatus 3 to execute a part of the processing, or indirectly execute the process using another program.

A description is given in detail of interpretation by the cloud service apparatus 5. As described above, the cloud service apparatus 5 includes the information recognition server apparatus 3 and the AI assistant server apparatus 4, and functions as one server apparatus. The storage unit, such as the HDD 44, of the AI assistant server apparatus 4 of the cloud service apparatus 5 stores the dictionary data. The voice conversion program generates an intent and a parameter based on the dictionary data. More specifically, the voice conversion program determines whether or not a word or the like in the text data converted from the speech of the user matches the dictionary data. Then, in response to a match in the dictionary data, the voice conversion program generates an interpretation result including the intent and the parameter defined in the dictionary data.

The dictionary data described above can be in any form as long as the intent and the parameter can be generated. As one example, the dictionary data includes entity information, intent information, and association information. The entity information associates a parameter for the MFP 7 to execute a predetermined process with a natural language. A plurality of synonyms can be registered in one parameter. The intent information indicates the type of the predetermined process as described above. The association information associates a speech or phrase (in natural language) spoken by the user with the entity information, and associates the phrase with the intent information. With such association information, the AI assistant server apparatus 4 (or the cloud service apparatus 5) can correctly interpret the speech even when the utterance order or nuance of the parameters is somewhat different. Further, the association information can generate a response text (interpretation result) based on the input contents. Some of the dictionary data is shared with AI assistant service information.

The entity information is stored in association with parameters and synonyms. Registering the synonyms together with the parameters is advantageous. For example, For printing a file or the like using the output device having the device ID of MFP_#1, speech of "output this" and speech of "print this" can be set as parameters for performing similar process.

A description is given of interactive actions. The voice control system 1 of the present embodiment achieves an interactive action by the interactive system in which the system responds to the voice or the like given by the user. The interactive operation is one of the operations executed by the feedback unit 253 of the smart speaker 2 as described above. Further, the voice control system 1 makes two kinds of responses specific to printing in the MFP 7, namely, "insufficient input feedback" and "input confirmation feedback," in addition to response with boilerplate text necessary for dialogue and the like. With this configuration, the voice control system 1 realizes an interactive output device operation system that enables printing in the MFP 7 in dialogue.

The smart speaker 2 outputs "insufficient input feedback" when the information necessary for executing printing in the MFP 7 is insufficient. The smart speaker 2 outputs "insufficient input feedback" when the smart speaker 2 does not catch contents of input from the user such as a voice command, or when items necessary as input contents for voice control (hereinafter referred to as requisite parameters) are insufficient. In other words, for items other than requisite parameters (hereinafter, also referred to as parameters), it is not necessary to perform the insufficient input feedback even when such an item is not instructed by the user. Further, the "insufficient input feedback" can include confirmation of a function necessary for printing in the MFP 7 in addition to the parameters.

In the interactive operation, the feedback unit 253 can change the function and the parameter to be confirmed by the user depending to the type of the output device communicating with the cloud service apparatus 5. In this case, the device information acquisition unit 457 of the AI assistant server apparatus 4 acquires the information indicating the type and the capabilities of the output device at a predetermined timing after the communication with the output device is established. Then, the device information acquisition unit 457 can determine the function and parameter regarding which the feedback unit 253 obtains confirmation from the user, based on the acquired information.

For example, when the type of output device is an MFP (e.g., the MFP 7), the feedback unit 253 can request confirmation from the user about the items (e.g., user name, date and time of use) necessary for printing by the MFP7. Further, the feedback unit 253 can request confirmation from the user about information such as equipment and resources used in the MFP 7. The device information acquisition unit 457 can change the requisite parameter according to the setting condition designated by the user. For example, when the print setting designated by the user involves, for example, stapling of half-hold sheets, the device information acquisition unit 457 can set a specific condition necessary for stapling of half-hold sheets (for example, right-open or left-open) as a requisite parameter.

The "input confirmation feedback" is output when the information sufficient to execute the printing of the MFP 7 is acquired. That is, "input confirmation feedback" is performed when all the requisite parameters are instructed. Further, the "input confirmation feedback" is performed to prompt the user to select whether to execute the printing with the current set value or change the set value. Note that, with the "input confirmation feedback," the system can obtain confirmation from the user about all the parameters instructed by the user (regardless of whether requisite parameters or not requisite parameters) in order to determine whether or not the printing is executed with the current setting values.

A description is given below of examples of information fed back from the AI assistant server apparatus. In the description above, the feedback unit 253 of the smart speaker 2 outputs text data and voice data included in the response information. Alternatively, the feedback unit 253 can generate text data corresponding to the response information based on the text data stored in the storage unit such as the ROM 23 of the smart speaker 2 and output a feedback (voice output and text output). The specific contents of the feedback will be described later.

Functional Configuration of Client Computer

The client computer 6 cooperates with the cloud service apparatus 5 (or the AI assistant server apparatus 4), to execute printing (or predetermined process) in the MFP 7 and the post-processing apparatus used by the MFP 7. However, the post-processing apparatus is not an essential target for processing by the client computer 6.

The CPU 61 of the client computer 6 deploys the command execution program stored in the storage unit such as the HDD 64 into the RAM 62 and executes the program. Thus, the CPU 61 functions or implements units functioning, for example, a communication control unit 651, a command receiving unit 652, a search unit 653, a print request transmission unit 654, a notification unit 655, a display control unit 656, and a storing and reading unit 657 (hereinafter, also referred to as communication control unit 651 to the storing and reading unit 657).

Next, a description is given of each functional unit of the client computer 6. The communication control unit 651 communicates with the communication control unit 451 of the AI assistant server apparatus 4 and the MFP 7 via the network 8. However, the communication can be performed directly with the communication control unit 251 of the smart speaker 2 or another client computer connected via the network 8.

The command receiving unit 652 acquires various commands including a print execution command for the MFP 7, a print cancel request, and a print status check command for inquiring the print status from the execution instruction unit 455 of the AI assistant server apparatus 4. Then, the command receiving unit 652 transfers those commands to the search unit 653 or the print request transmission unit 654. That is, the command receiving unit 652 functions as, for example, an output request receiving unit. Note that the command receiving unit 652 can receive a unique command that can be executed by the output device even when the output device is other than the MFP 7.

When the command receiving unit 652 receives the print execution command, the search unit 653 searches for various information in the storage unit, such as the HDD 64, based on the settings in the print execution command (an output device name, an output device ID, an output device installation location, a user name, a user ID, etc.). Then, the search unit 653 identifies the file that is a target of the print execution command and generates a print request or request of a predetermined process to the MFP 7 (output device).

The print request transmission unit 654 transmits the print request to the MFP 7. At this time, the print request transmission unit 654 functions as an example of an output target transmission unit. In addition, for example, when the command receiving unit 652 receives the print execution command, the print request transmission unit 654 updates a print status stored in the storage unit such as the HDD 64 based on the settings in the print execution command (an output device name, an output device ID, an output device installation location, a user name, a user ID, etc.). By contrast, when printing in the MFP 7 is not feasible due to some reason, the print request transmission unit 654 can report an error, receiving a status signal or the like from the MFP 7. At that time, the error report is transmitted to the smart speaker 2 via the cloud service apparatus 5 or directly from the client computer 6. Further, when acquiring a print cancel request accompanying the reception of the error report, the print request transmission unit 654 deletes, from the storage unit, the printing to be performed in the MFP 7 that matches the settings. As described above, the print request transmission unit 654 functions as the output target transmission unit that transmits the output target specified by the print execution command or predetermined process command, to the MFP 7, generated by the voice input to the smart speaker 2 by the user. The output target transmission unit further transmits various setting information relating to the output target.

The notification unit 655 determines whether to perform notification to the MFP 7 or the smart speaker 2 based on a predetermined condition. Further, the notification unit 655 gives various notifications to the MFP 7, for example, at the execution time of printing in the MFP 7 or a predetermined time prior to the execution time of the printing. When the output device is other than an MFP, the notification contents are, for example, information on activation of or login to each device. The notification unit 655 can perform notification to the MFP 7 at the time of acceptance of the print instruction from the user. In this case, the MFP 7 can execute any one of the above processes at the print start time. Furthermore, the contents of the notification transmitted to the MFP 7 can be contained in the print request or preset in the client computer 6. In addition, for example, when there is duplication of the print contents, or in response to an occurrence of a malfunction in the target MFP 7 (to which the print request has been transmitted) at a predetermined time (for example, 10 minutes) prior to the print start time, the notification unit 655 can notify the smart speaker 2 of duplication of print contacts or malfunction via the communication control unit 651 by email, image distribution, or the like.

The display control unit 656 controls display of a Web screen operated by the user on the client computer 6, an edit screen of each application, a text file, a photograph, a moving image, etc., on the display 60 of the client computer 6 or a display connectable to client computer 6. The display 60 of the client computer 6 functions as a display device that displays an output target.

The storing and reading unit 657 controls the storage unit such as the HDD 64 to read and write various data.

In the present embodiment, the communication control unit 651 to the storing and reading unit 657 are implemented by software, but some or all of these can be implemented by hardware such as an IC.

Next, a description is given of a specific example of the association DB 402 with reference to FIGS. 5A and 5B. FIGS. 5A and 5B are examples of data tables managed in the association DB 402 used in the voice control system 1 which is an example of the information processing system. For example, the smart speaker 2 having the device ID "ud1001" instructs printing in the output device named "MFP_#1," and the device ID of "MFP_#1" is "d0001" Although a detailed description is omitted below, in the device management table 402b of the association DB 402 illustrated in FIG. 5B, the ID of the information input device is associated with the ID of the MFP 7. That is, the association DB 402 stores the ID of each smart speaker 2 in association with the ID of the corresponding MFP 7 so that the smart speaker 2 and the MFP 7 can be identified. Note that the types and values of the respective IDs illustrated in FIGS. 5A and 5B are examples, and are not limited to the description above.

Functional Configuration of MFP

In FIG. 8, the CPU 701 of the MFP 7, which is an example of the output device, deploys a print execution program stored in the storage unit such as the HDD 709 into the RAM 702b and executes the print execution program based on the print execution command transmitted from the client computer 6. By executing the print execution command, the CPU 701 functions or implements units functioning as, for example, a communication control unit 751, a print request receiving unit 752, a search unit 753, a print execution unit 754, a notification unit 755, and a storing and reading unit 756.

Next, a description is given of each functional unit of the MFP 7. The communication control unit 751 communicates with the communication control unit 651 of the client computer 6 via the network 8. However, the communication control unit 751 can directly communicate with the cloud service apparatus 5 (or the AI assistant server apparatus 4).

The print request receiving unit 752 receives a predetermined print request such as a print execution command executed by the MFP 7 from the client computer 6 or the cloud service apparatus 5 (or the AI assistant server apparatus 4). That is, the print request receiving unit 752 functions as a receiving unit that receives, from the client computer 6, the output target file or data to be output from the MFP 7.

When the print request receiving unit 752 receives the print request or the print execution command, the search unit 753 searches for various information in the storage unit, such as the HDD 64, based on the settings in the print request or the print execution command (an output device name, an output device ID, an output device location, a user name, a user ID, etc.). Then, the search unit 753 identifies the file that is a target of the print execution command, and generates a print request or request of a predetermined process to the client computer 6.

The print execution unit 754 executes printing in the MFP 7 based on the print request received by the print request receiving unit 752. In addition, for example, when the print request receiving unit 752 receives the print request, the print execution unit 754 updates a print status stored in the storage unit such as the HDD 709 based on the settings in the print request (an output device name, an output device ID, an output device location, a user name, a user ID, etc.). By contrast, when printing in the MFP 7 is not feasible due to some reason, the print execution unit 754 can report an error, receiving a status signal or the like from the MFP 7. At that time, the error report is transmitted to the smart speaker 2 via the client computer 6 or directly from the MFP 7. Further, when acquiring a print cancel request accompanying the reception of the error report, the print execution unit 754 deletes, from the storage unit, the printing to be performed in the MFP 7 that matches the condition.

As described above, the print execution unit 754 functions as the output unit that executes outputting (e.g., printing) in a format designated by the print instruction or instruction of a predetermined process to the MFP 7, which is input by voice of the user to the smart speaker 2. The printing performed in the MFP 7 can be, for example, printing executed by an electrophotographic image forming apparatus. In the present embodiment, the print execution unit 754 has been described using the printing in the MFP 7 as an example. However, in a case of an output device that can perform other processes than printing, the file or data received from the information processing apparatus can be output in a format, such as displaying, specified in the output request.

The notification unit 755 notifies the client computer 6 or the smart speaker 2 of the status of the MFP 7. The contents of the notification are, for example, information relating to the print operation and other operations of the device, and information about activation of or login to the device. The notification unit 755 can notify the client computer 6 of the above-mentioned various information at the time of acceptance of the print instruction from the user. By contrast, the notification unit 755 can notify the client computer 6 of various information at the print start time specified in the print request from the user. In addition, when there is duplication of the print contents in the print request, or in response to an occurrence of a malfunction in the device at a predetermined time (for example, 10 minutes) prior to the print start time, the notification unit 755 can notify at least one of the smart speaker 2 and the client computer 6 of duplication of print contacts or malfunction via the communication control unit 751 by email, image distribution, or the like.

The storing and reading unit 756 controls the storage unit such as the HDD 709 to read and write various data.

In this embodiment, the communication control unit 751 to the storing and reading unit 756 are implemented by software, but some or all thereof can be implemented by hardware such as an IC.

Outline of Processing of Voice Control System

The voice control system 1 according to the present embodiment executes commands of printing or predetermined process in various output devices such as the MFP 7 by the voice input from the user to the smart speaker 2. That is, when the print execution command generated by the cloud service apparatus 5 (or the AI assistant server apparatus 4) is transmitted to the client computer 6, the client computer 6 identifies the data necessary for the printing executed by the WP 7 based on the specifying information in the received print execution command. After that, the client computer 6 transmits a print request to the MFP 7 based on the identified data, and the MFP 7 executes the predetermined printing. The outline described above is described in detail below.

Described in the present embodiment is a configuration in which the client computer 6 receives, from the cloud service apparatus 5, a print execution command generated based on the voice or the like input by the user, and controls MFP 7. Further, the MFP 7 receives the print execution command transmitted from the cloud service apparatus 5, and transmits a file request to the client computer 6 based on the received print execution command. Then, the MFP 7 again receives the identified file from the client computer 6 and controls the MFP 7 itself.

A description is given of the first embodiment of the present disclosure.

Figure 9:
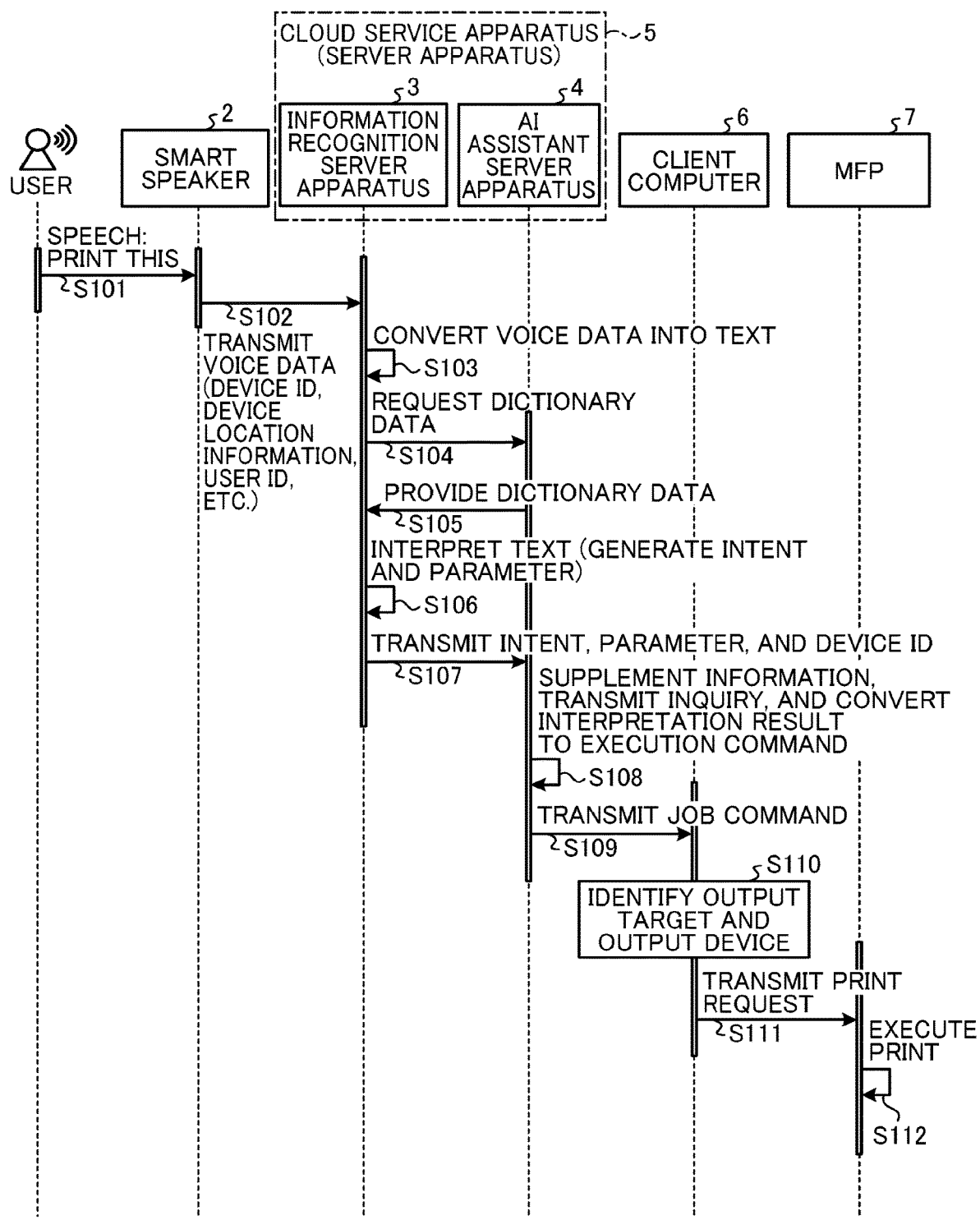
FIG. 9 is a sequence diagram illustrating an example of a processing flow according to the first embodiment.

FIG. 9 is a sequence diagram illustrating an example of the flow of processing in the first embodiment. A description is given of a case where the user transmits a print request from the smart speaker 2 to the MFP 7 following the sequence diagram illustrated in FIG. 9. Specifically, the first embodiment presents an example of printing a predetermined file or the like using MFP_#1 in response to a speech of the user. The respective processes in the sequence diagram are described below.

In the voice control system 1 according to the present embodiment described below, for example, the smart speaker 2 is next to the client computer 6 used by the user.

Figure 10:
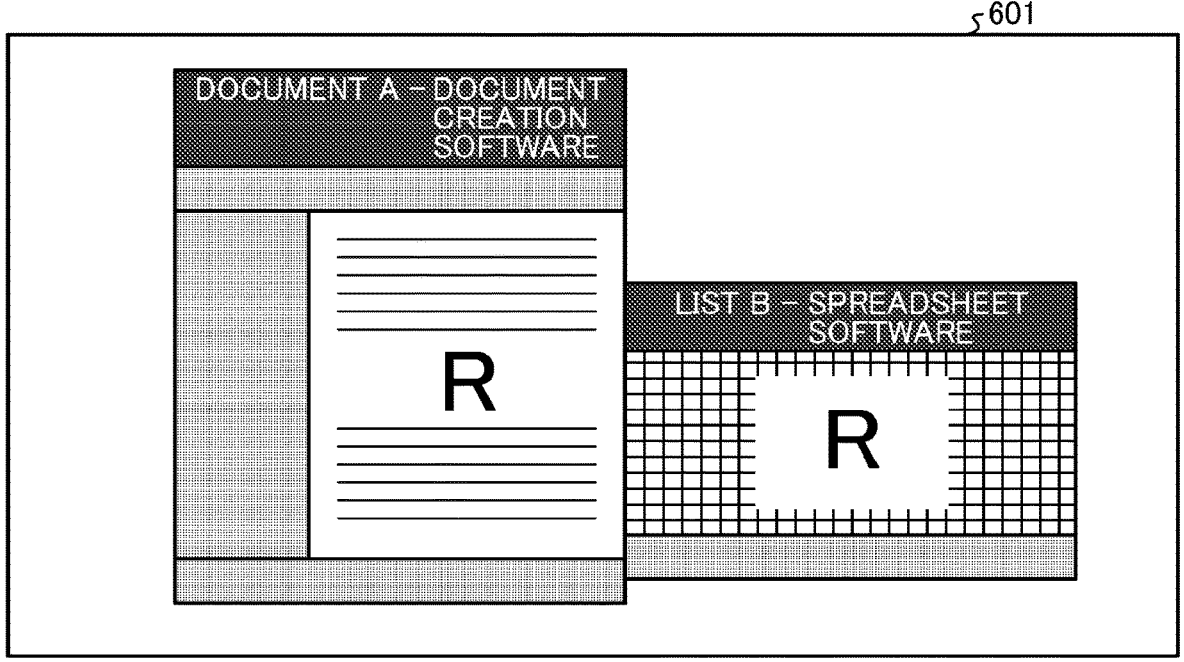
FIG. 10 is a diagram illustrating an example of a display screen of the client computer according to the first embodiment.

FIG. 10 is a diagram illustrating an example of a display screen on the display 60 of the client computer 6 in the first embodiment. In FIG. 10, a file "document A.doc" in format by a document creation software, such as Word (registered trademark), is displayed on the display 60 of the client computer 6 as being edited. Further, the display 60 also displays a file "list B.xlsx" in a format of a spreadsheet software, such as Excel (registered trademark). In the present embodiment, the screen displaying "document A.doc" is the active window on the display 60 of the client computer 6. In this state, when the user speaks "print this" to the smart speaker 2, the acquisition unit 252 of the smart speaker 2 acquires voice data (audio data) using, for example, the microphone 29 illustrated in FIG. 3, based on the voice command "print this" by the user (S101).

However, here, the speech contents are not limited thereto and can be an instruction in any manner of printing of the file displayed on the display 60 of the client computer 6. For example, information (hereinafter, also referred to as specifying information) specifying a display device or a storage location of a file can be spoken.

Further, regarding the operations by voice input in the present embodiment, for example, the instructions from the user can include a process performed by, for example, a finisher that executes a process subsequent to process of the MFP 7, in addition to the printing in the MFP 7. That is, the speech can include instructions to execute a plurality of processes at the same time, such as "print this and perform stapling."

Then, the communication control unit 251, which is implemented when the operation command processing program stored in the storage unit such as the ROM 23 of the smart speaker 2 is executed, transmits the voice data (in the case where the acquired data is voice data) to the information recognition server apparatus 3 by the voice processing program included in the operation command processing program. At this time, the communication control unit 251 also transmits the device ID for identifying the smart speaker 2 to the information recognition server apparatus 3 (S102).

The device ID is an example of information that identifies the smart speaker 2 associated with the user. For example, instead of or in addition to the device ID, position information of the smart speaker 2, the user ID that identifies the user of the smart speaker 2, or personal information such as a user name or an organization to which the user belongs can be transmitted.

Subsequently, the acquisition unit 352 of the information recognition server apparatus 3 acquires the voice data and the like transmitted, together with the device ID, from the smart speaker 2 via the communication control unit 351, and converts the data into text (S103). At this time, the information recognition server apparatus 3 executes the voice conversion program and the like. However, the timing at which the information recognition server apparatus 3 executes the voice conversion program and the like is not limited thereto.

The acquisition unit 352 described above can also have the capability of the acquisition unit 252 of the smart speaker 2 for acquiring the voice data and the like. In that case, the acquisition unit 352 has a capability of acquiring the user voice command collected, for example, via the microphone 29 together with the device ID of the smart speaker 2 and the user ID of the user. That is, the acquisition unit 352 has both the functions to perform S101 and S102 described above. Similar to the acquisition unit 252 of the smart speaker 2, such an acquisition unit 352 can function as an example of the voice data acquisition unit. That is, the information recognition server apparatus 3 can function as an example of a server apparatus including the voice data acquisition unit.

After that, the text conversion unit 353 of the information recognition server apparatus 3 converts the voice data into text by the voice conversion program when the acquired data is voice data. By contrast, when the acquired data is image data, the text conversion unit 353 of the information recognition server apparatus 3 converts the image data into text by the operation image conversion program. Such a text conversion process is, for example, a process of converting information based on the voice command indicating "print this" into text data.

Subsequently, the voice conversion program transmits a dictionary data request to the AI assistant server apparatus 4 (specifically, to the voice assistant program executed by the AI assistant server apparatus 4) via the communication control unit 351 (S104).

The acquisition unit 452 of the AI assistant server apparatus 4 acquires the dictionary data request from the information recognition server apparatus 3 via the communication control unit 451. The AI assistant server apparatus 4, which has acquired the text-converted voice data and the like, provides dictionary data to the voice conversion program executed by the information recognition server apparatus 3 in response to the acquisition of the dictionary data request (S105).

When executing the voice assistant program, the AI assistant server apparatus 4 can download the voice assistant program stored in the storage unit such as the HDD 34 of the information recognition server apparatus 3 via the network 8 and executes the voice assistant program.

Subsequently, as the information recognition server apparatus 3 executes the voice conversion program, the interpretation unit 354 interprets the text-converted voice data and the like to generate an intent and a parameter (S106).

Specifically, in S106, the interpretation unit 354 determines whether a word or the like in the text data matches the dictionary data, based on the dictionary data acquired from the voice assistant program. That is, text interpretation is performed. When the word in the text matches the dictionary data, the interpretation unit 354 converts the data into an intent indicating an intention of the user and a parameter indicating a variable of an execution setting of a predetermined process. Alternatively, the providing unit 356 can perform the processing of the interpretation unit 354 described above.

The converted intent and parameter are, for example, "intent: PRINT EXECUTE" (corresponding to "Action" in Table 1) and "parameter: THIS". In the present embodiment, the intent is information that instructs the client computer 6 to transmit a print request to the MFP 7. The parameter is information indicating a file to be transmitted by the client computer 6 to the MFP 7. However, the present disclosure is not limited thereto. For example, the parameter can include information on print setting (number of copies, color/monochrome, etc.) of the print request transmitted to the MFP 7 from the client computer 6. Further, the parameter can include information for identifying the file to be transmitted from the client computer 6 to the MFP 7. For example, when the user speaks specifying information designating the file as the print target in S101, the specifying information can be included in the parameter.

When the print target is identified by the cloud service apparatus 5 as will be described later, the parameter is information of the file, such as a file name and a network address indicating the storage location of the file.

More specifically, the interpretation unit 354 generates "intent: PRINT EXECUTE" as information on the intent to perform printing in the MFP 7, and generates, for example, "output device name: MFP_#1" as information on the parameter of printing executed in the MFP 7. Thus, based on the text data, the interpretation unit 354 generates an interpretation result indicating, for example, a request of predetermined process (e.g., printing) designated by the user, a process type (intent), and contents (parameters) of the process. Although the output device name is used as the information for identifying the MFP 7 as the parameter in the above-described example, the information is not limited thereto as long as the information is for the client computer 6 to identify the MFP 7. For example, the address information of the MFP 7 can be used as the information for identifying the MFP 7. Alternatively, in a case where printing is performed using the MFP 7 that is the default printer of the client computer 6, it is not necessary to include the information for identifying the MFP 7 in the parameters.

Subsequently, the interpretation unit 354 transmits the generated intent, the parameter, and the device ID of the smart speaker 2 (information input device) to the management program executed by the cloud service apparatus 5 (or the AI assistant server apparatus 4) in S107.

Next, a description is given of an example of supplementation of information and inquiry executed by the cloud service apparatus 5 (or the AI assistant server apparatus 4).

First, the interpretation result conversion unit 453 of the AI assistant server apparatus 4 converts the intent, the parameters, the device ID of the smart speaker 2, and the like acquired by the acquisition unit 452 into data of a print execution command for the MFP 7. At this time, "PRINT EXECUTE" representing execution of printing is given as the intent, and "MFP_#1" representing the output device name is given as the parameter. The interpretation result conversion unit 453 serves as a conversion unit. Hereinafter, MFP_#1 is used as an example of the output device, but the output device can be of any type illustrated in the device management table 402b. Further, the parameters can be those of any type having the contents (job command, specifying information, execution program, etc.) illustrated in the user management table 402a and the device management table 402b.

Accompanying the data conversion by the interpretation result conversion unit 453, the search unit 460 identifies MFP #1 as the target that executes the printing based on the device ID of the smart speaker 2 or the user ID of the user.

Further, the supplementation unit 454 refers to the device management table 402b stored in the association DB 402 and supplements the voice data given by the user with information relating to the generation of the print execution command executed by MFP #1. There may be a case where the supplementation unit 454 is not able to supplement the information necessary for generating the requisite parameters for the print execution command even by referring to the device management table 402b. In such a case, the supplementation unit 454 can provide feedback to the user via the smart speaker 2 and prompt the user to input (acquire) the information necessary for generating the requisite parameters. The processing relating to the supplementation is performed by the supplementation unit 454.

The management unit 459 can register the device ID or the user ID in association with MFP_#1 in the association DB 402 in advance. Note that the user ID can be identified by the following method, for example. When a user uses the smart speaker 2, the user speaks his/her name toward the microphone 29 of the smart speaker 2. In response to the input of the name by speech, the acquisition unit 252 of the smart speaker 2 refers to a user ID list (table) stored and managed in the storage unit such as the ROM 23, in cooperation with the storing and reading unit 254. After that, the acquisition unit 252 checks the name in the form of text converted from the voice with the user ID list (table) stored and managed in the storage unit and identifies the user ID of the user who has spoken. Instead of inputting the name, a mail address or the like of the user can be input. Further, the imaging unit (camera) 30 of the smart speaker 2 can be used to capture the face of the user, and the user ID can be identified based on the captured image.

Further, when the information about printing or the like in MFP_#1 is given with a new combination of the user ID and the device ID, the management unit 459 can add such information to the device management table 402b of MFP_#1 stored and managed in the storage unit (such as the HDD 44) of the AI assistant server apparatus 4, thereby updating the device management table 402b of MFP_#1.

Next, the device information acquisition unit 457 determines whether or not the requisite parameters required for printing in MFP_#1 are sufficient based on the acquired intent and parameters. This requisite parameters are, for example, information for identifying an output target and an output device that outputs the output target among the received parameters. Therefore, the requisite parameters include, for example, the name of the user who outputs the output target, an output date and time, an arbitrary parameter (settings) such as the number of sheets in the printing, a color/monochrome setting, and the like.

Further, such requisite parameters can be stored in advance in the storage unit (such as the HDD 44) of the AI assistant server apparatus 4 as the device management table 402b relating to the above-mentioned MFP_#1, and can be set appropriately. Furthermore, a requisite parameter can be replaced with a normal parameter as appropriate according to the combination of the user and the output device. That is, a parameter defined as a requisite parameter under a certain condition can be managed as a normal parameter under another condition.

From the description above, the device information acquisition unit 457 has the following features. The device information acquisition unit 457 refers to the device management table 402b stored in the association DB 402 and adds supplement information relating to generating of requisite parameters for identifying the output target (file, screen data, etc.) and the output device (MFP_#1, etc.). An example of the information relating to the generation of the requisite parameters, in other words, the information relating to the voice data, is a modifier such as "this," "currently being edited," or "after the latest update" when the output target is a file. In a case where the device information acquisition unit 457 is not able to supplement the information necessary for generating the requisite parameters even by referring to information relating to generation of parameters and the device management table 402b, the device information acquisition unit 457 can provide feedback to the user via the smart speaker 2 and prompt the user to input the information necessary for generating the requisite parameters.

The execution determination unit 456 determines whether or not the requisite parameters are sufficient, based on the supplemented information. At that time, in response to a determination that the requisite parameters are not sufficient even with the supplemented contents, the execution determination unit 456 asks the user for the requisite parameters via the notification unit 458. For such inquiry, the cloud service apparatus 5 transmits information for inquiry to the smart speaker 2, and voice or the like is provided to the user.

When the requisite parameters are not sufficient, the execution determination unit 456 continues inquiry and prompts the user via the smart speaker 2 to designate the parameter until the requisite parameters are supplemented. In the supplementation of information and the inquiry of requisite parameters thus executed, the interpretation result conversion unit 453 and the execution determination unit 456 can collaborate with each other, to function as the acquisition control unit 462 to supplement the information relating to the voice data given from the user.

At this time, the requisite parameters can be changed based on the device ID or the user ID acquired from the smart speaker 2 in S102. Further, the requisite parameters can include the user of MFP_#1. However, when the user does not input an identification as the user of MFP_#1 (user ID of the user or the like) in the voice input, the execution determination unit 456 determines whether the user can be identified based on the device ID or the user ID acquired from the smart speaker 2 in S102. For example, the smart speaker 2 may be used exclusively by one user. Therefore, the execution determination unit 456 determines whether a user associated with the device ID of the smart speaker 2 (information input device) or the user ID of the user of the smart speaker 2 is registered in the association DB 402. That is, the execution determination unit 456 searches for the user based on the device ID or the user ID, and identifies the user.

When the user is identified, the execution determination unit 456 can set the user as a user of MFP_#1 in the parameter. By contrast, when the user is not identified, the execution determination unit 456 can inquire the user to set the user via the smart speaker 2. That is, in order to generate data representing a request of a predetermined process (print instruction), the execution determination unit 456 can communicate with the smart speaker 2 via the notification unit 458 and the communication control unit 451, to ask the user to input supplement information.

The parameters can include information about the user of MFP_#1. However, when the user does not set information relating to the user, namely, the user name or the user ID, in the voice input, the execution determination unit 456 determines whether the output device (e.g., MFP_#1) can be identified based on the device ID or the user ID acquired from the smart speaker 2 in S102.

Based on the determination, the search unit 460 searches for and identifies MFP_#1 used for printing. When MFP_#1 is identified as the output device, the search unit 460 sets MFP_#1 as a parameter of the output device used for printing. By contrast, when the output device is not identified, the search unit 460 can cooperate with the notification unit 458 to inquire the user to set the output device via the smart speaker 2.

Even when the user sets MFP_#1 in the voice input, there may be a plurality of output devices whose names are identical with the set MFP_#1. Therefore, the execution determination unit 456 can determine whether or not the output device can be identified by the device ID or the user ID in addition to the name of the output device set in the voice input. That is, the execution determination unit 456 determines whether any output device associated with the device ID or the user ID is registered in the association DB 402. Subsequently, the search unit 460 searches for the output device based on the device ID and the user ID in addition to the name of the output device set in the voice input, and identifies the target output device from the search results.

In a case where the searching unit 460 identifies the output device as MFP_#1, the searching unit 459 sets MFP_#1 as a parameter of the output device used for printing. By contrast, when the output device is not identified, the search unit 460 can ask the user to set the details of the output device via the smart speaker 2 in cooperation with the notification unit 458 (S108). Although the description is made above of the case where the AI assistant server apparatus 4 identifies the MFP 7 that executes printing, alternatively, the client computer 6 can identify the MFP 7. In this case, identifying of the MFP 7 in the AI assistant server apparatus 4 can be omitted.

Here, a description is given of actions and parameters as the table data used in the present embodiment, using a specific example illustrated in Table 1. Note that the interpretation result conversion unit 453 of the AI assistant server apparatus 4 can be configured to store, for example, the information presented in Table 1 (described in detail below) in a storage unit, such as the HDD 44, of the AI assistant server apparatus 4 and refer to the stored information, to convert the interpretation result generated by the information recognition server apparatus 3 into data representing a print execution command of printing in MFP_#1.

TABLE 1

| NAME | VALUE | VOICE ACTION APP PROCESS |
|---|---|---|
| ACTION | PRINT EXECUTE | EXECUTE PRINTING |
|  | EMAIL EXECUTE | TRANSMIT EMAIL |
|  | STORE EXECUTE | STORE DATA IN STORAGE SERVICE |
|  | TURN ON | TURN ON IWB |
|  | TURN OFF | TURN OFF IWB |
|  | . . . | . . . |
|  | . . . | . . . |
|  | . . . | . . . |
| PARAMETER | THIS | CONTROL IDENTIFYING FILE |
|  | CURRENT | CONTROL EMAIL TRANSMISSION |
|  | CLOUD | CONTROL ACCESS TO CLOUD SERVICE |
|  | ON | CONTROL IWB POWER |
|  | OFF | CONTROL IWB POWER |
|  | . . . | . . . |
|  | . . . | . . . |
|  | . . . | . . . |
|  | * |  |

The AI assistant server apparatus 4 stores the table data, including a print execution command for the output device, presented in Table 1, in a storage unit such as an HDD. The interpretation result conversion unit 453 of the AI assistant server apparatus 4 can be configured to store and refer to the information equivalent to Table 1 in the storage unit (such as the HDD 64) of the client computer 6 in order to convert the interpretation result acquired by the information recognition server apparatus 3 into a print execution command.

In the example presented in Table 1, "PRINT EXECUTE", "EMAIL EXECUTE", "STORE EXECUTE", and the like are examples of actions or intents. Further, "THIS," "CURRENT," "CLOUD" and the like are examples of parameters. Note that the parameters include all parameters that can be setting values for a print execution command or the like to the MFP 7.

In the present embodiment, for example, the interpretation result conversion unit 453 converts the interpretation result of "PRINT EXECUTE" into a command indicating "execute printing" to MFP_#1. Similarly, the interpretation result conversion unit 453 converts the interpretation result of "EMAIL EXECUTE" into a command indicating "transmit email" to MFP_#1. Similarly, the interpretation result conversion unit 453 converts the interpretation result of "STORE EXECUTE" into a command indicating "store data in storage service" to MFP_#1.

That is, the interpretation result conversion unit 453 of the AI assistant server apparatus 4 determines the type of execution command to MFP_#1 based on the information included in the action or intent of the interpretation result, and determines that the value of the parameter is the setting value of the execution command, thereby converting the interpretation result into the execution command. Note that an asterisk in Table 1, that is, the value of the parameter, can be any setting value designable for the instruction of the predetermined process.

The AI assistant server apparatus 4 can store, in a storage unit such as the HDD 44, table data including an execution command of a predetermined process different from Table 1, and use the table data to feedback the interpretation result, generated by the interpretation result conversion unit 453, to the smart speaker 2.

The interpretation result conversion unit 453 generates, for example, a print execution command (job command) required for printing in MFP_#1 from the information supplemented in S108, and transmits the print execution command to the client computer 6 via the communication control unit 451 (S109). The print execution command (job command) at this time is an example of a first output request. In a case where the AI assistant server apparatus 4 can identify the file being the print target, the execution instruction unit 455 transmits the print execution command to the MFP 7. By contrast, the execution instruction unit 455 can transmit the print execution command to the client computer 6 only when the AI assistant server apparatus 4 fails to identify the print target. That is, when the file name is included in the speech of the user and the search unit 460 can identify the file having the same name as the file name, the execution instruction unit 455 directly transmits the print execution command to the MFP 7 not via the client computer 6. By contrast, when the user instructs "print this," that is, when the parameter generated from the speech is "THIS," the AI assistant server apparatus 4 is not able to identify the file being the print target. Accordingly, the execution instruction unit 455 transmits the print execution command to the client computer 6.

The process of S109 corresponds to the process (1) illustrated in the system configuration diagram of FIG. 1, for example. Further, the interpretation result conversion unit 453 functions as an output request transmission unit for the client computer 6, for example. In this case, the cloud service apparatus 5 (or the AI assistant server apparatus 4) transmits, to the client computer 6, for example, a print execution command corresponding to the instruction contents such as "print this," "print this here", or "print this on that printer," instructed by the speech of the user.

(Identification of File to be Transmitted and Destination Output Device)

Subsequently, the search unit 653, which functions as the command execution program (first program) installed in the client computer 6 is executed, identifies the file to be transmitted and the output device as the destination based on the print execution command acquired from the cloud service apparatus 5 (or the AI assistant server apparatus 4).

For example, when the information includes "THIS," which is an example of information specifying the print execution command file, the search unit 653 identifies the file or data in the active window on the display 60 of the client computer 6 as the target (file) meant by the word "THIS" to be transmitted to the MFP 7. That is, when a plurality of programs are running on the client computer 6, the search unit 653 determines the print target based on the program corresponding to the window targeted by the user. In addition, the search unit 653 can identify an item (output candidate), such as an image, a page, and a file, currently displayed as an output target (print target) as a screenshot of the display 60 for, for example, a second program such as a Web browser (Web application program) or document creation software.

Furthermore, the search unit 653 can identify MFP_#1 as the output device to which the output target is output, based on the information stored and managed in the device management table 402b and the user ID of the user who is speaking, in response to the speech of the user, for example, "print this." Similarly, when the instructions by speech of the user is like "print this with that printer," and includes a reference term like "that" for the printer being the output device, the search unit 653 can identify the corresponding MFP_#1 or the like as the target output device for outputting the output target, based on the information stored and managed in the device management table 402b and the user ID of the user who speaks. More specifically, when the print execution command acquired from cloud service apparatus 5 does not include information for identifying the MFP 7, the search unit 653 determines the MFP 7 to output the print target. The search unit 653 can determine the MFP 7 set by default in the client computer 6 as the output destination MFP 7. That is, the search unit 653 determines, as the output destination MFP 7, the MFP 7 preset as the normally used printer in the setting of the printer driver or the operating system (OS) that is one example of a third program. Thus, when the search unit 653 identifies the MFP 7, identifying the MFP 7 by the AI assistant server apparatus 4 can be omitted.

After the search unit 653 identifies the file to be transmitted and the output device, the print request transmission unit 654 transmits the identified print target to MFP_#1 via the third program such as the printer driver that controls printing in the MFP 7. Note that two or all of the first to third programs can be the same program.

The method of identifying the file to be transmitted and the output device is not limited to the above example. For example, the search unit 653 can identify a file being updated or a file having the latest update date and time in the client computer 6 as a file to be transmitted to MFP_#1. When the print execution command includes specifying information other than "THIS," the search unit 653 can identify the file to be transmitted to MFP_#1 based on the specifying information. For example, when the specifying information includes the file name, the search unit 653 can identify the file by the first program searching the HDD 64 of the client computer 6 for the file. Further, when the specifying information includes the information specifying the second program, the search unit 653 can identify, as the output target, the page or the file displayed by the second program, such as a Web browser or a document creation software, regardless of whether the window displayed on the client computer 6 is the active window.

Further, the search unit 653 can change the identified output device to MFP_#2 instead of MFP_#1 depending on the situation. The "situation" is, for example, the operating status or installation condition of the output device. That is, when MFP_#1 is in operation, but MFP_#2 is in the energy saving mode or has a malfunction, the search unit 653 selects MFP_#1 that can immediately perform the printing. In addition, there may be a case where a large amount of printing of the output target file is instructed, MFP_#2 is closer to the user who gives the print instruction than MFP_#1, and both are available for printing. In such a case, the search unit 653 can identify MFP_#2 closer to the user as the output device in consideration of the transportation of the output files by the user. Further, for the purpose of operating a more secure information processing system, the search unit 653 can identify the MFP installed in the department to which the user belongs as the output device by referring to the user ID of the user who gives a voice command or the like. In other words, the search unit 653 can identify the output destination output device for each user or each output file, for example (S110). That is, the client computer 6 stores and manages the information of the usable MFP 7 in advance. For example, the client computer 6 communicates with the MFP 7 or receives a voice command from the user, thereby acquiring and storing information of the MFP 7, such as address information, position information, information indicating an operating status, function information indicating the function or performance, or the presence or absence of an option.

In this way, the search unit 653 identifies the file to be transmitted and the output device after receiving the print execution command. That is, in the present embodiment, in identifying targets based on the above-described print execution command, the interpretation result conversion unit 453 of the AI assistant server apparatus 4 also identifies the file to be transmitted and the output device. However, regarding the identification of the output device in particular, the search unit 653 can appropriately change the output device determined by the interpretation result conversion unit 453 depending on the operating status, installation condition, or the like of the output device.

A description is given in detail of the identification of the file to be transmitted and the output device executed in S110 described above, with reference to FIGS. 10 and 11. FIG. 10 is a diagram illustrating an example of a display screen of the client computer according to the first embodiment. FIG. 11 is a flowchart illustrating an example of a process of identifying a file to be transmitted according to the first embodiment.

Referring to the flowchart of FIG. 11, a description is given of handling of a job command transmitted to the client computer 6 from the interpretation result conversion unit 453 and the communication control unit 451 of the AI assistant server apparatus 4. First, the command receiving unit 652 of the client computer 6 receives a job command (print execution command) from the AI assistant server apparatus 4 (S1000).

Next, the search unit 653, to which the print execution command is transferred from the command receiving unit 652, determines whether the print target needs to be identified based on the job command (print execution command) acquired from the AI assistant server apparatus 4 (S1001).

In response to a determination that the print target needs to be identified (Yes in S1001), the search unit 653 determines whether or not, for example, the specifying information included in the received print execution command indirectly specifies the print target (S1002). Note that "indirectly specify" signifies, for example, a case where the specifying information includes a word including a pronoun such as "this" and "that."

In the determination in S1002, in response to reception of the print command "print this" from the AI assistant server apparatus 4, the search unit 653 analyzes the meaning of the word "this" in the print command "print this". At that time, based on the information included in the received print execution command, the search unit 653 refers to the user management table 402*a* and the device management table 402*b* and searches for an item corresponding "this", using the user ID: u0010 of the user who uses the smart speaker 2 and the device ID: ud1001 of the smart speaker 2 used by the user.

That is, when the specifying information indirectly specifies the print target (Yes in S1002), referring to the device management table 402*b* in FIG. 5B, the search unit 653 identifies "this" as the file "document A.doc" in the format of the document creation software being edited on the active window of the client computer 6 (PC1) which is the information processing apparatus associated with the user ID: u0010, the device ID: ud1001 of the smart speaker 2 used by the user, and the apparatus ID: i001 of the information processing apparatus used by the user (S1003).

The active window is, for example, the window presenting the file "Document A.doc" in the format of the document creation software in the state illustrated in FIG. 10.

By contrast, when the search unit 653 determines in S1001 that identification of the print target is not necessary (No in S1001), the search unit 653 exits this flow.

By contrast, when the received print execution command has a content other than "print this," that is, the print execution command does not include a pronoun such as "THIS" (No in S1002), the search unit 653 executes the following process. For example, the search unit 653 determines whether the specifying information included in the print execution command specifies the file being updated (edited) or the latest file on the client computer 6 by the same method as in S1003 (S1004).

Next, when the specifying information included in the print execution command specifies the file being updated or the latest file on the client computer 6 (Yes in S1004), the search unit 653 identifies the file or data being updated or latest (S1005).

By contrast, when the specifying information included in the print execution command does not specify the file being updated or the latest file on the client computer 6 (No in S1004), the search unit 653 determines whether the specifying information includes a file name (S1006).

When the specifying information in the print execution command includes a file name such as "print file A" (Yes in S1006), the search unit 653 searches the HDD 64 of the client computer 6 for the file. Then, the data is identified (S1007).

By contrast, when the specifying information does not include the file name (No in S1006), the search unit 653 determines whether the specifying information includes a second program such as a Web browser or a document creation program (S1008).

When the specifying information includes the second program (Yes in S1008), the search unit 653 identifies the data such as a file or a page displayed by the second program (S1009).

By contrast, when the specifying information does not include the second program (No in S1008), the search unit 653 identifies data such as a file or a page according to the contents of the job command (print execution command) (S1010).

Note that the flowchart illustrated in FIG. 11 is an example, and the processing executed by the search unit 653 is not limited to the example described above. For example, the contents of the above-described flowchart can be changed depending on the environment in which the voice control system 1 according to the present embodiment is placed, the usage of the system, and the like, to identify the file to be transmitted to the MFP 7.

Returning to the sequence diagram of FIG. 9, as described above, the search unit 653 of the client computer 6 identifies the file to be printed by the MFP 7 based on the print execution command (S110). That is, the search unit 653 serves as an identifying unit that identifies, from the specific parameter (an example of specifying information) included in the voice data uttered by the user, at least one of the file to be printed (an example of an output target) and the output destination MFP 7 (an example of the output device), and generates a print execution command (an example of the output request). Specifically, the search unit 653 identifies, as the file to be printed included in the print execution command, an output target such as a page and a file displayed in the active window of the display 60, a file executed by the program of the Web application, and a print file executed by the printer driver. Further, the search unit 653 identifies the MFP 7 that outputs the print target file included in the print execution command.

Subsequently, the print request transmission unit 654 of the client computer 6 transmits the print request to MIP #1 via the communication control unit 651 (S111). At this time, the print request transmission unit 654 functions as, for example, a first output target transmission unit.

The print request transmission unit 654 of the client computer 6 can register, in advance, MFP_#1 as the destination of the print request by the printer driver or the OS, which is one of the third programs owned by the client computer 6. The display control unit 656 of the client computer 6 can display, on the display 60 of the client computer 6, a screen indicating that the identified file and a message that the print request is to be transmitted to MFP_#1, before the identified file is transmitted to MFP_#1. In this case, the print request transmission unit 654 can transmit the identified print target file or the like to MFP_#1 on condition that a permission is received from the user.

Figure 12A:
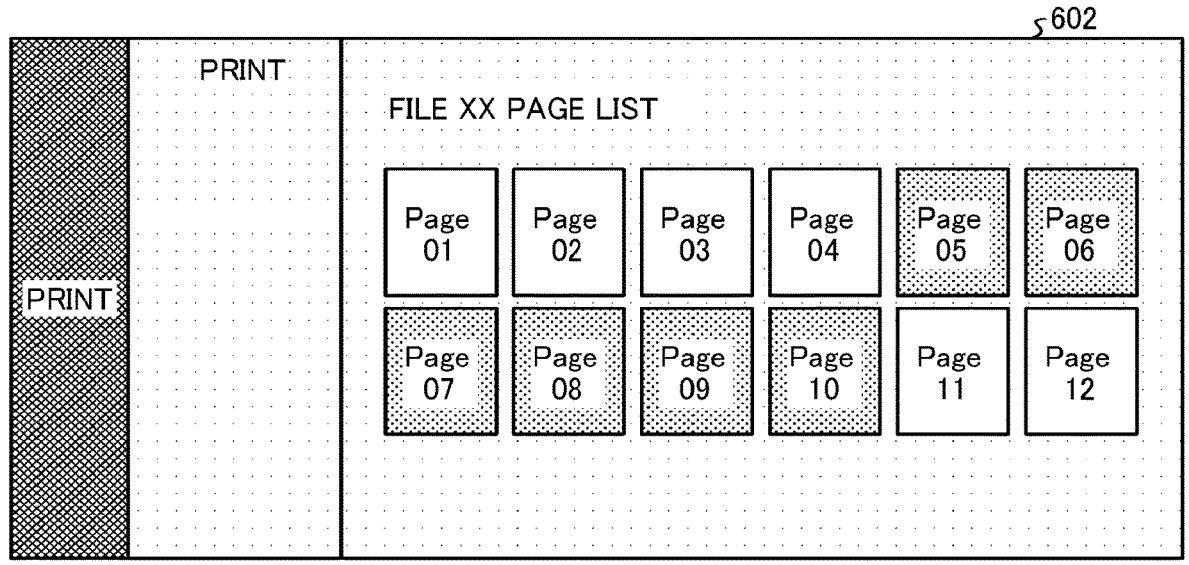
FIGS. 12A and 12B are diagrams illustrating examples of screens for identifying a file or a page.
Figure 12B:
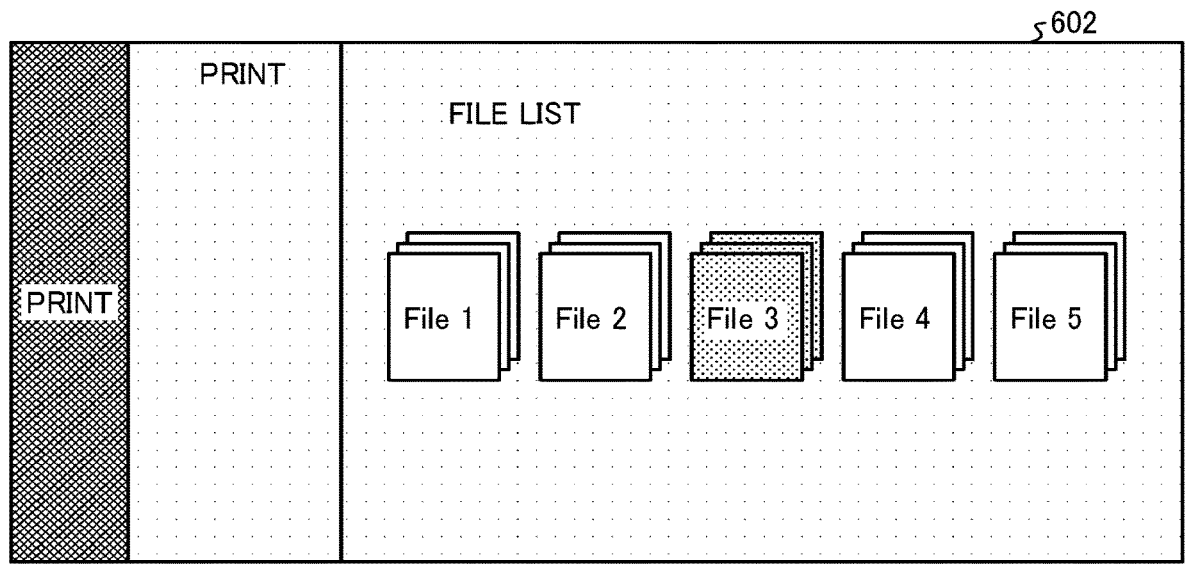

FIGS. 12A and 12B are diagrams illustrating examples of identifying a file or a page on a screen. In FIGS. 12A and 12B, when a file including a plurality of pages is identified, the display control unit 656 can cause the display 60 of the client computer 6 to display a list of preview images of the pages in a selectable manner as illustrated in FIG. 12A. The user can select a desired image from the preview images of the plurality of pages displayed on the display 60, thereby selecting the image to be printed. In the case of FIG. 12A, six pages from page number 05 to page number 10 are designated by the user as the print target.

Furthermore, when a plurality of files have been acquired, the display control unit 656 can display a "file list", such as a list of files in a selectable manner illustrated in FIG. 12B, as a user interface (UI) on the display 60 of the client computer 6. The user can select a desired file from the plurality of files displayed on the display 60, thereby selecting the file to be printed. In the case of FIG. 12B, the user designates "File 3" as the print target. In the above-described embodiment, the display control unit 656 displays the page or file to be printed in grey, so that the page or the file selected as the target for printing is distinguishable at a glance. That is, the display control unit 656 has a capability of displaying the identified output target in a distinguishable manner from other candidates for outputting.

The system can be configured to provide and display such a UI so that the user can select the page or the file to be printed from the displayed pages and files.

The process of S111 corresponds to, for example, the process (2) illustrated in the system configuration diagram of FIG. 1. Further, in a configuration in which the client computer 6 is connected with the MFP 7 by a wired cable or the like, the process of S111 can be executed by the route (3) illustrated in the system configuration diagram of FIG. 1. The communication control unit 651 can instruct the MFP identified by the search unit 653 to print the file identified by the search unit 653 in the setting specified by the print execution command acquired from the AI assistant server apparatus 4.

Subsequently, the MFP 7 (e.g., MFP_#1), identified as the printing execution target by the client computer 6, prints the print target transmitted from the print request transmission unit 654 of the client computer 6 (S112).

The MFP 7 can display, for example, on the control panel 740 of the MFP 7, a screen indicating the acquired file, the print setting, and execution of printing. At this time, the change of the print setting can be accepted, or the printing can be executed on condition that the permission of the user is accepted.

The MFP 7 can activate the power supply and network settings of the apparatus in accordance with the print execution command transmitted from the client computer 6, to start and execute printing of the file, transmission of the file, and the like. In a case where the MFP 7 needs to execute another process, the smart speaker 2 can provide a feedback prompting the user of the MFP 7 to give, by speech or the like, an instruction for a finisher or the like that executes a post-process.

Further, the print request transmission unit 654 of the client computer 6 can give, to the user who has instructed the smart speaker 2 to perform printing using the MFP 7 via the notification unit 655, a print completion notification indicating that the printing has been completed. In this case, the print execution command transmitted from the AI assistant server apparatus 4 to the client computer 6 can include, for example, address information as information for identifying the smart speaker 2. As a result, the notification unit 655 can transmit the result of the printing based on the address information. Alternatively, the client computer 6 can transmit, to the MFP 7, the address information of the smart speaker 2 included in the print execution command acquired from the AI assistant server apparatus 4, so that the notification unit 755 of the MFP 7 can transmit the result of printing based on the transmitted address information.

Although, in the above-described embodiment, the client computer 6 transmits the print request to the MFP 7, the present disclosure is not limited thereto. That is, after the client computer 6 identifies the file, the client computer 6 can transmit the identified file to the management program executed by the cloud service apparatus 5, and the management program can transmit the file together with the print request to the MFP 7. In this case, the command execution program of the client computer 6 can transmit the identified file to the management program. Further, when the management program acquires the file from the client computer 6, the management program can transmit a job command (print execution command) to the MFP 7 or the like associated with the device ID. The job command can include file data or address information indicating a file storage location. Further, the MFP 7 can execute printing based on the job command acquired from the management program.

In the present embodiment, the voice control system 1 can be configured to automatically execute related processing in addition to the printing by the MFP 7, using machine learning of the voice data such as the speech of the user, based on, for example, the past print history of the MFP 7, the usage history of the MFP 7, and the information of each management table of the association DB 402 in FIGS. 5A and 5B.

The first embodiments provides the following effects.

As is apparent from the description above, the voice control system 1 according to the first embodiment installs programs including the voice processing program, which is a platform application program, on the smart speaker 2, and communicates with the cloud service apparatus 5 by the platform application program. As the user instructs the microphone 29 or the imaging unit 30 of the smart speaker 2 operation by speech, the cloud service apparatus 5 analyzes the contents of the speech of the user and the like, and operates the output device such as the MFP 7, to execute printing or a predetermined process instructed by the user.

With such a configuration, an operation necessary for executing printing or a predetermined process in the MFP 7 can be realized by a minimal voice input by the user. That is, such a configuration enables a desired output by giving a simplified instruction. As a result, such a configuration can obviate the need of operation on a graphical user interface (GUI) such as the touch panel 27. Therefore, even a user who is accustomed to the operation can perform the input operation more quickly and easily. Further, by the operation support by dialogue or the like, for example, complicated network setting, advanced processing setting, and introduction of a new application become unnecessary. As a result, even an elderly person or a user who is unfamiliar with machine operation can perform, quickly and easily, the operation desired by the user. Thus, convenience is improved.

Further, since the system analyzes the intention of the user based on the text data acquired from the contents of speech or the like by the user, the cloud service apparatus 5 (or the AI assistant server apparatus 4) can perform determination on the processing contents based on the speech or the like of the user.

A description is given of a second embodiment of the present disclosure.

In the second embodiment, differences from the first embodiment are mainly described. Configurations that are not particularly mentioned can be the same as those in the first embodiment, and detailed descriptions thereof are omitted.

In the second embodiment, the print execution command, which is generated by the cloud service apparatus 5 (or the AI assistant server apparatus 4), is transmitted to the MFP 7 instead of the client computer 6. That is, in the voice control system 1 according to the second embodiment, the MFP 7 (output device) has a database corresponding to the above-mentioned association DB 402. That is, in this database, the device ID of the smart speaker 2 or the identification information of the user (for example, the user ID) transmitted from the smart speaker 2, the identification information (for example, apparatus ID) of the client computer 6 (information processing apparatus) used by the user, and the address information are stored and managed in association with each other. Such a configuration is also aimed at reducing the load of constructing a storage in the server apparatus (the cloud service apparatus 5). An additional difference from the first embodiment is that the MFP 7 transmits a request of the file to the client computer 6 based on the information for identifying the client computer 6 acquired from the cloud service apparatus 5.

Hereinafter, the above-described differences are described with reference to a sequence diagram and a flowchart.

Figure 13:
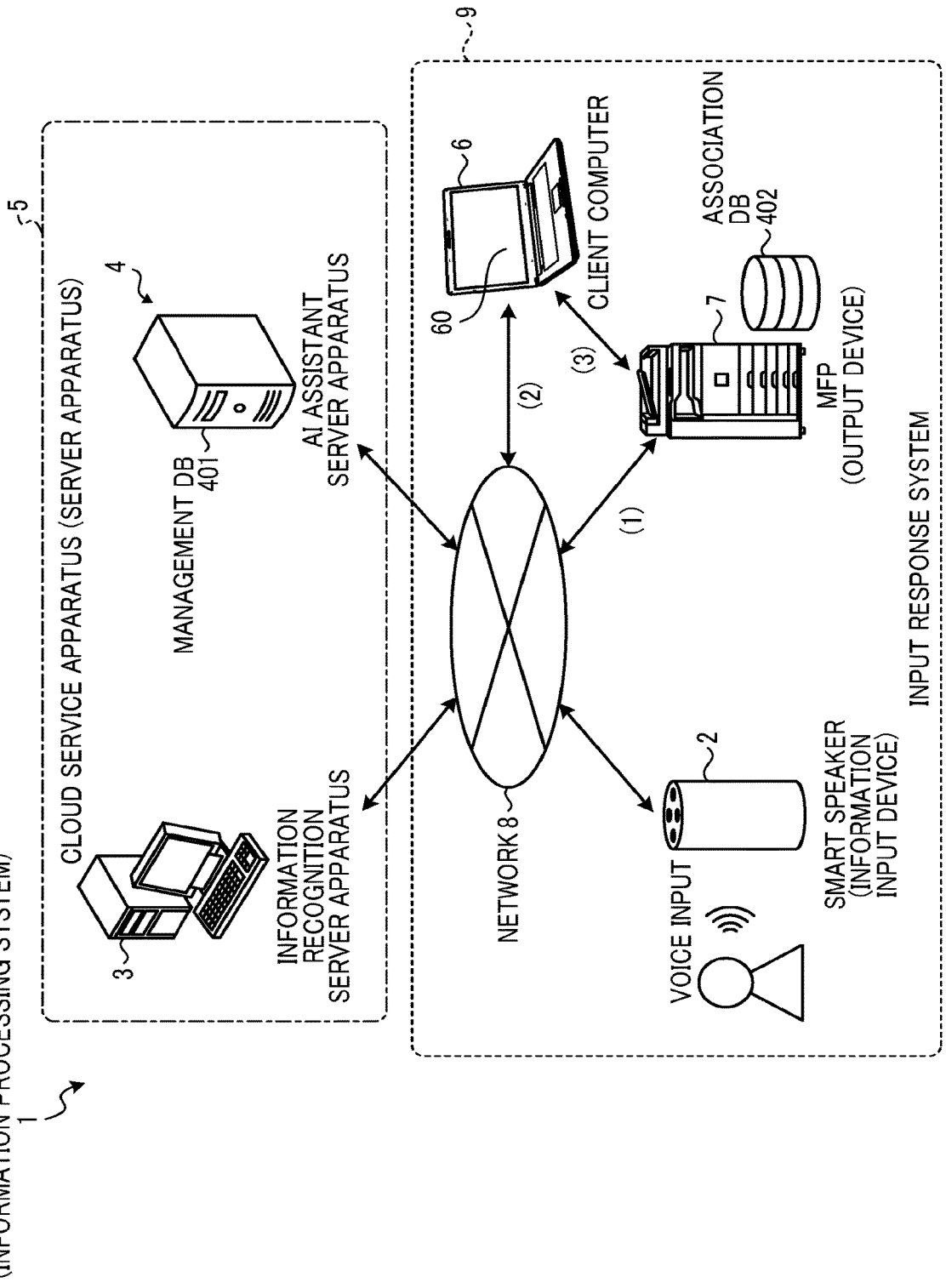
FIG. 13 is a diagram illustrating an example of a configuration of a voice control system according to a second embodiment.

FIG. 13 is a diagram illustrating an example of the configuration of the voice control system according to the second embodiment. The hardware configuration and the functional configuration of each device are the same as those in FIG. 1 described above, except that the transmission and reception path of the print execution command is partly different from that of the first embodiment. Thus, redundant descriptions are omitted.

Figure 14:
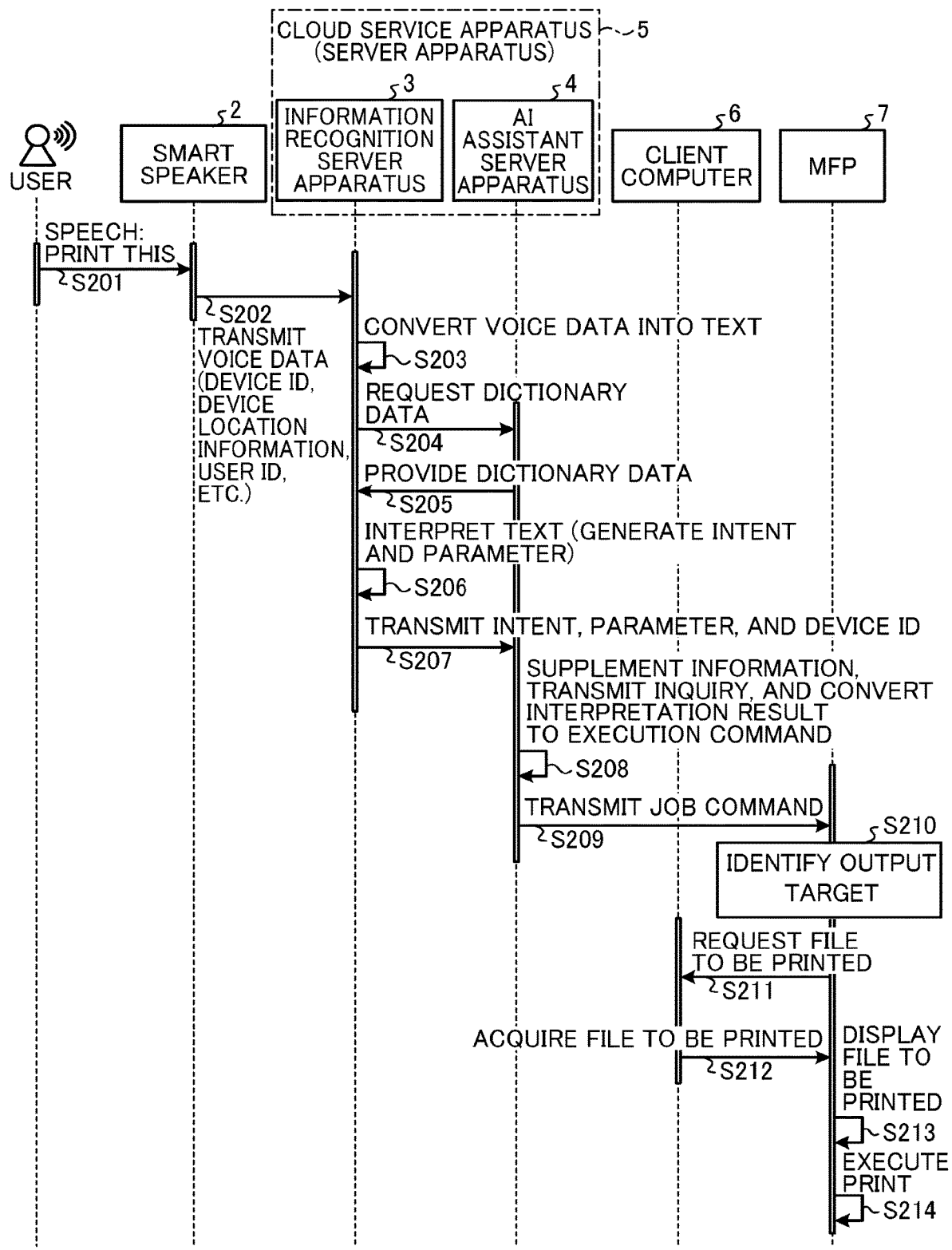
FIG. 14 is a sequence diagram illustrating an example of a processing flow according to the second embodiment.

FIG. 14 is a sequence diagram illustrating an example of the flow of processing in the second embodiment. In the second embodiment, a description is given of an example in which a print execution command generated based on a speech of the user or the like using the smart speaker 2 is transmitted from the cloud service apparatus 5 (or the AI assistant server apparatus 4) to the MFP 7, and then subsequent processes are executed. However, the second embodiment can also be implemented by a similar system configuration and a similar hardware configuration of each device to those of the first embodiment described above, and a similar functional configuration to that of the first embodiment.

In the sequence diagram of FIG. 14, processes in S201 to S205 are the same as those in S101 to S105 of the first embodiment, so detailed descriptions are omitted.

In S206, as the voice conversion program or the like is executed by the information recognition server apparatus 3, the interpretation unit 354 interprets the text.

Specifically, the interpretation unit 354 interprets the text converted from the voice data or the like, and generates an intent and parameters. The interpretation unit 354 determines whether a word or the like in the text data matches the dictionary data, based on the dictionary data acquired from the voice assistant program. When the word in the text matches the dictionary data, the interpretation unit 354 converts the data into an intent indicating an intention of the user and a parameter indicating a variable of an execution setting of a predetermined process. Alternatively, the providing unit 356 can perform the processing of the interpretation unit 354 described above.

In the present embodiment, the intent is information indicating a print request to the MFP 7. The parameters are information specifying a print target and includes, for example, information for identifying the output device such as the type and name of the output device, print date and time, and information regarding a user who uses the output device. When the user instructs printing using a plurality of output devices, the parameters can include a plurality of pieces of information identifying the output devices. Further, the intent or parameter can include information requesting the MFP 7 to search for a file to be printed. For example, in a case where the user speaks predetermined specifying information in S201, the specifying information can be included in the parameters. As will be described later, when the print target is identified by the cloud service apparatus 5, the name of the file to be printed, address information indicating the storage location of the file, and the like are given as the parameters.

Thus, based on the text data, the interpretation unit 354 generates an interpretation result indicating, for example, a request of printing designated by the user, a predetermined process type (intent), and contents (parameters) relating to the predetermined process (S206).

Subsequently, the interpretation unit 354 transmits the generated intent, the parameters, and the device ID of the smart speaker 2 to the management program executed by the cloud service apparatus 5 (or the AI assistant server apparatus 4) in S207.

the information supplementation, inquiry, and conversion to the execution command (print execution command in the present embodiment) of the predetermined process in the subsequent S208 are the same as those in the first embodiment. Thus, detailed description are omitted.

Similar to the first embodiment, the interpretation result conversion unit 453 generates a print execution command corresponding to the contents "print this" converted based on the intent and the parameters, and transmits the print execution command, via the communication control unit 451, e.g., MFP_#1 (MFP 7) that is the target output device (S209). At this time, the interpretation result conversion unit 453 functions as an output request transmission unit for the MFP 7, for example. Further, the print execution command (job command) at this time is an example of the second output request.

The interpretation result conversion unit 453 transmits, to the MFP 7, information necessary for identifying the client computer 6, such as the device ID or the user ID, either included in the transmitted print execution command or separately. Further, the interpretation result conversion unit 453 refers to the device management table 402b illustrated in FIG. 5B and stored in the MFP 7, and identifies the client computer 6 from the device ID or the like. Then, the interpretation result conversion unit 453 determines whether or not to transmit, to the MFP 7, the information for identifying the client computer 6 generated based on the intent or the parameters. For example, on the condition that the parameter included in the print execution command is "THIS," the interpretation result conversion unit 453 can determine to transmit the information for identifying the client computer 6 to the MFP 7. However, the condition is not limited thereto. The interpretation result conversion unit 453 can be configured to determine to transmit the information for identifying the client computer 6 to the MFP 7, for example, in a case where the speech of the user in S201 is like "print the file on the personal computer (PC)" and includes "PC" as information for identifying the storage location of the file.

(Identification of Print Target)

Subsequently, the search unit 753 of the MFP 7 determines whether or not it is necessary to identify the print target based on the print execution command acquired from the interpretation result conversion unit 453. For example, the search unit 753 performs identification of the print target on the condition that the print target is designated by, for example, "THIS", and is not uniquely specified.

The search unit 753 can perform identification of the print target in response to a reception of the specifying information. Further, when the print execution command includes information relating to the file such as the file name and the address information of the file storage location, the search unit 753 can uniquely identify the file. Therefore, the search unit 753 can omit the following process in S211. Similarly, when the print execution command includes file data to be printed, the search unit 753 can omit the following process in S211 (S210). The search unit 753 also identifies the client computer 6 based on the device ID or the user ID of the smart speaker 2 included in the print execution command. The details of the process of S210 in the present embodiment are the same as the concept described in the first embodiment and the flowchart in FIG. 11. Thus, detailed description are omitted.

Next, based on the information for identifying the client computer 6 acquired from the cloud service apparatus 5, the search unit 753 requests the client computer 6 of the file (S211). That is, the search unit 753 can be an example of an output target request unit that identifies the output target (file or data) based on the output request (e.g., print execution command) for outputting the output target, and transmits a request of acquisition of necessary data to the client computer 6 (information processing apparatus). By contrast, the command receiving unit 652 of the client computer 6 can also function as an output target request receiving unit that receives the output request of the print target file transmitted from the MFP 7 in S211.

Here, the process on the client computer 6 is similar to that in S110 of the first embodiment. However, the first program acquires the file request from the MFP 7, and requests the file from the second program or the third program based on the file request. The program for transmitting the identified file to the MFP 7 can be any of the first, second, and third programs. However, the client computer 6 transmits a reply including the file to the MFP 7 which is the transmission source of the file request. Therefore, the search unit 653 can omit the process of identifying the MFP 7.

Subsequently, the print request receiving unit 752 acquires the file to be printed from the client computer 6 (S212). At this time, the print request transmission unit 654 of the client computer 6 functions as, for example, a second output target transmission unit. In the process at that time, for example, the print request receiving unit 752 can acquire the file being edited or has been edited on the display 60 of the client computer 6 as the print target.

Subsequently, the print request receiving unit 752 displays the file to be printed acquired in S212, for example, on the panel display 740a of the control panel 740 of the MFP 7 (S213). The print request receiving unit 752 can display a preview image or a list of pages when a file including a plurality of pages is acquired in S212, or can display a list of files when a plurality of files are acquired. The user can select the page or the file to be printed from the displayed pages or the displayed files.

Subsequently, the print execution unit 754 prints the page or file selected (S214).

In the embodiment described above, the client computer 6 transmits the print status of the various output devices such as the MFP 7 to the smart speaker 2 via the cloud service apparatus 5 (or the AI assistant server apparatus 4). However, the configuration is not limited thereto. For example, the client computer 6 can directly transmit the print status of the above-described various output devices such as the MFP 7 to the smart speaker 2. In this case, the print execution command can include a request for notifying the smart speaker 2 of the print status and information, such as address information of the smart speaker 2, necessary for accessing the smart speaker 2. The notification destination of the print status is not limited to the smart speaker 2. For example, the print status can be transmitted directly to the client computer 6 or other information input device or via the cloud service apparatus 5 (or the AI assistant server apparatus 4).

The second embodiments provides the following effects.

As is apparent from the description above, the voice control system 1 according to the second embodiment installs programs including the voice processing program, which is a platform application program, on the smart speaker 2, and communicates with the cloud service apparatus 5 by the platform application program. As the user inputs a speech to the microphone 29 or the imaging unit 30 of the smart speaker 2, the cloud service apparatus 5 analyzes the contents of the speech and the like of the user, and transmits, to the MFP 7, the print instruction or the like instructed to the MFP 7 by the user. Subsequently, the MFP 7 identifies the file to be transmitted from the client computer 6 and requests the client computer 6 to transmit the identified file. The client computer 6 requested for the file transmits the file to be printed to the MFP 7. Then, the MFP 7 executes printing.

With such a configuration, an operation necessary for the MFP 7 to receive the print instruction and execute printing can be realized by a minimal voice input (speech) by the user. That is, such a configuration enables a desired output by giving a simplified instruction. As a result, such a configuration can obviate the need of operation on a GUI such as the touch panel 27. Therefore, even a user who is accustomed to the operation can perform the input operation more quickly and easily. Further, by the operation support by dialogue or the like, for example, complicated network setting, advanced processing setting, and introduction of a new application become unnecessary. As a result, even an elderly person or a user who is unfamiliar with machine operation can perform, quickly and easily, the operation desired by the user. Thus, convenience is improved.

Further, since the system analyzes the intention of the user based on the text data acquired from the contents of speech or the like by the user, the cloud service apparatus 5 (or the AI assistant server apparatus 4) can perform determination on the processing contents based on the speech or the like of the user.

Each of the functions of the described embodiments can be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit components arranged to perform the recited functions.

The information input device is not limited to the smart speaker as long as the device has a microphone function, an image capture function, a speaker function, a display function, an operation function, a communication function, and the like. The information input device is, for example, a laptop computer, a mobile phone, a smartphone, a tablet terminal, a game console, a personal digital assistant (PDA), a camera, a wearable PC, or a desktop computer.

Further, the information processing apparatus can communicate with the server apparatus and the output device. The information processing apparatus is not limited to the client computer as long as the apparatus has a capability to communicate with the output device.

Similarly, the output device is not limited to the above-described MFP, and can be of any type capable of communication via a network for transmitting and receiving various contents such as screens and images on the information processing apparatus. For example, the output device can be an electronic device such as a projector, an electronic white board (e.g., interactive white board or IWB), a video conference/Web conference system such as a unified communication system (UCS), and a digital signage. At this time, the MFP 7 can be configured, while controlled by the client computer 6, to directly receive, for example, an execution command transmitted from the cloud service apparatus 5 and perform processing without communicating with the client computer 6.

The above-described embodiments are illustrative and do not limit the present disclosure. Thus, numerous additional modifications and variations are possible in light of the above teachings. Any one of the above-described operations may be performed in various other ways, for example, in an order different from the one described above. For example, elements and/or features of different illustrative embodiments may be combined with each other and/or substituted for each other within the scope of the present disclosure. For example, in the above-described first embodiment, the information recognition server apparatus 3 generates text data corresponding to the speech or the like given by the user, and the AI assistant server apparatus 4 interprets the generated text data into the operation intended by the user. Alternatively, the smart speaker 2 (information input device) can have such voice recognition function and interpretation function, so that the smart speaker 2 can interpret the intended operation from the speech of the user. Such a configuration can obviate the necessity of the information recognition server apparatus 3 and the AI assistant server apparatus 4, and the system configuration can be simplified. These embodiments and modifications thereof are included in the scope and gist of the present disclosure, and are included in the scope of claims and the equivalent scope thereof

What is claimed is:

1. An information processing system comprising circuitry configured to:
   acquire voice data via an information input device;
   acquire information of the information input device including an identifier of the information input device;
   supplement the voice data with relating information on a basis of a prestored device management table and the information of the information input device so as to generate an output request in which at least an output device to output an output target is identified based on the voice data, the prestored device management table in which each of identifiers of a plurality of information input devices corresponds to one of identifiers of a plurality of output devices, the identified output device being one of the plurality of output devices whose identifier corresponding to the identifier of the information input device in the prestored device management table;
   transmit the output request to the identified output device; and
   cause the output device to output the output target contained in the output request,
   wherein the prestored device management table further includes connection information of the plurality of output devices, which includes address information of the plurality of output devices, and
   the plurality of information input devices and the plurality of output devices are connected to one another via a network.

2. The information processing system according to claim 1, wherein the circuitry is configured to:
   display the output target on a display;
   identify the output device and the output target based on the voice data and at least one output candidate displayed on the display; and
   identify, as the output target of the output request, at least one of an output candidate in an active window of the display, an output candidate executed by a Web application program, and an output candidate executed by a printer driver.

3. The information processing system according to claim 1,
   wherein circuitry is configured to prompt input of information for supplementing the voice data.

4. The information processing system according to claim 1, comprising a server having capabilities to acquire information based on an instruction operation including a voice input and a machine operation.

5. The information processing system according to claim 2, wherein the circuitry is configured to display the output target to be transmitted to the output device in a distinguishable manner from another output candidate displayed on the display.

6. An information processing apparatus comprising circuitry configured to:
receive, from either an output device or a server, a request for outputting an output target, wherein the request is generated by acquiring voice data via an information input device; and supplement the voice data with relating information on a basis of a prestored device management table so as to generate the request, the prestored device management table in which each of identifiers of a plurality of information input devices corresponds to one of identifiers of a plurality of information processing apparatuses and one of identifiers of a plurality of output devices;
identify the output target based on the request;
when the request is received from the server, transmit the output target to a target output device designated, by the received request, to output the output target; and
when the request is received from the output device, transmit the output target to the output device from which the request is received,
wherein the prestored device management table further includes connection information of the plurality of information processing apparatuses, which includes address information of the plurality of information processing apparatuses, and
the plurality of information input devices, the plurality of information processing apparatuses, and the plurality of output devices are connected to one another via a network.

7. An information processing method executed by an information processing system including a server, an information processing apparatus, and an output device,
the method comprising:
acquiring voice data via an information input device;
acquiring information of the information input device including an identifier of the information input device;
supplementing the voice data with relating information on a basis of a prestored device management table and the information of the information input device so as to generate an output request in which at least the output device to output an output target is identified based on the voice data, the prestored device management table in which each of identifiers of a plurality of information input devices corresponds to one of identifiers of a plurality of output devices, the identified output device being one of the plurality of output devices whose identifier corresponding to the identifier of the information input device in the prestored device management table; and
transmitting the output request to the output device,
wherein the prestored device management table further includes connection information of the plurality of output devices, which includes address information of the plurality of output devices, and
the plurality of information input devices and the plurality of output devices are connected to one another via a network.

8. The information processing system according to claim 1, wherein the plurality of output devices include a plurality of multifunction peripherals each having a document server function, a copy function, a printer function, and/or a facsimile function.

9. The information processing apparatus according to claim 6, wherein the plurality of output devices include a plurality of multifunction peripherals each having a document server function, a copy function, a printer function, and/or a facsimile function.

10. The information processing method according to claim 7, wherein the plurality of output devices include a plurality of multifunction peripherals each having a document server function, a copy function, a printer function, and/or a facsimile function.

* * * * *